United States Patent
Niibe et al.

(10) Patent No.: US 8,184,975 B2
(45) Date of Patent: May 22, 2012

(54) PASSIVE OPTICAL NETWORK SYSTEM AND OPTICAL LINE TERMINATOR

(75) Inventors: Masao Niibe, Fujisawa (JP); Tohru Kazawa, Kokubunji (JP); Takeshi Kiyose, Fujisawa (JP); Ryosuke Nishino, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 588 days.

(21) Appl. No.: 12/388,020

(22) Filed: Feb. 18, 2009

(65) Prior Publication Data

US 2010/0067913 A1   Mar. 18, 2010

(30) Foreign Application Priority Data

Sep. 16, 2008   (JP) ................................. 2008-235982

(51) Int. Cl.
  *H04J 14/00* (2006.01)
  *H04B 10/00* (2006.01)
(52) U.S. Cl. .................... 398/67; 398/165; 398/167.5
(58) Field of Classification Search ............ 398/67, 398/165, 167.5
See application file for complete search history.

(56) References Cited

U.S. PATENT DOCUMENTS

| | | | |
|---|---|---|---|
| 2008/0089686 A1* | 4/2008 | Kazawa et al. | 398/71 |
| 2008/0166127 A1* | 7/2008 | Kazawa et al. | 398/79 |
| 2008/0317469 A1* | 12/2008 | Kazawa et al. | 398/71 |
| 2009/0010650 A1* | 1/2009 | Tsuchiya et al. | 398/59 |
| 2009/0052896 A1* | 2/2009 | Kazawa et al. | 398/58 |
| 2009/0052897 A1* | 2/2009 | Kazawa et al. | 398/71 |
| 2009/0080891 A1* | 3/2009 | Kazawa et al. | 398/79 |
| 2009/0202242 A1* | 8/2009 | Niibe et al. | 398/63 |

OTHER PUBLICATIONS

Gigabit-capable Passive Optical Networks (GPON): Physical Media Dependent (PMD) Layer Specification, Series G: Transmission Systems and Media, Digital Systems and Networks, ITU-T G.984.2 (Mar. 2003).
Gigabit-capable Passive Optical Networks (GPON): Transmission Convergence Layer Specification, Series G: Transmission Systems and Media, Digital Systems and Networks, ITU-T FG.984.3, (Feb. 2004).
Gigabit-capable Passive Optical Networks (GPON): General Characteristics, Series G: Transmission Systems and Media, Digital Systems and Networks, ITU-T G.984.1 (Mar. 2003).

* cited by examiner

*Primary Examiner* — Nathan Curs
(74) *Attorney, Agent, or Firm* — Antonelli, Terry, Stout & Kraus, LLP.

(57) ABSTRACT

In a passive optical network system in which signals from a master station to plural slave stations are time-division multiplexed and transmitted, the slave stations different in transmission speed are mixedly contained. The master station (OLU) performs ranging for each transmission speed, and grasps all the slave stations different in transmission speed for each transmission speed, and generates a frame including signals of a suitable transmission speed corresponding to each slave station. When the frame is generated, in a downstream signal in which signals of plural transmission speeds are mixed, a dummy signal is set at a place where the transmission speed is changed, and a time necessary to follow a change in level of a received signal due to a change in optical level caused when the transmission speed is changed is secured. Thereby, each ONU avoids a reception error occurring in the time necessary to follow.

14 Claims, 23 Drawing Sheets

FIG. 4A

| | ONU NUMBER | SIGNAL |
|---|---|---|
| NO.1 | #1 | 1G |
| NO.2 | #2 | 1G |
| ⋮ | | |
| NO.16 | #16 | 1G |

FIG. 4B

| | ONU NUMBER | SIGNAL |
|---|---|---|
| NO.17 | #17 | 10G |
| NO.18 | #18 | 10G |
| ⋮ | | |
| NO.64 | #64 | 10G |

FIG. 4C

| | ONU NUMBER | SIGNAL |
|---|---|---|
| NO.1 | #1 | 1G |
| NO.2 | #2 | 1G |
| ⋮ | | |
| NO.16 | #16 | 1G |
| NO.17 | #17 | 10G |
| NO.18 | #18 | 10G |
| ⋮ | | |
| NO.64 | #64 | 10G |

| NO.1 | ONU NUMBER | START | END | SIGNAL | REMARKS |
|---|---|---|---|---|---|
| NO.1 | #33 | 310 | 350 | 5G | PRIORITY 1 |
| NO.2 | #1 | 360 | 400 | 1G | PRIORITY 2 |
| NO.3 | #34 | 410 | 450 | 5G | PRIORITY 3 |
| NO.4 | #2 | 460 | 500 | 1G | PRIORITY 4 |

FIG. 10

| | ONU NUMBER | DATA AMOUNT | SIGNAL | REMARKS |
|---|---|---|---|---|
| NO.1 | #33 | 50 | 10G | PRIORITY 1 |
| NO.2 | #1 | 50 | 1G | PRIORITY 2 |
| NO.3 | #34 | 50 | 10G | PRIORITY 3 |
| NO.4 | #35 | 50 | 10G | PRIORITY 4 |

FIG. 11A

|  | ONU NUMBER | START | END | SIGNAL | REMARKS |
|---|---|---|---|---|---|
| NO.1 | #33 | 34 | 89 | 10G | PRIORITY 1 |
| NO.2 | #1~16 | 90 | 100 | 1G | 1G DUMMY SIGNAL |
| NO.3 | #1 | 101 | 156 | 1G | PRIORITY 2 |
| NO.4 | #17~64 | 157 | 167 | 10G | 10G DUMMY SIGNAL |
| NO.5 | #34 | 168 | 223 | 10G | PRIORITY 3 |
| NO.6 | #35 | 224 | 279 | 10G | PRIORITY 4 |
| NO.7 | #1~16 | 700 | 710 | 1G | 1G OVERHEAD |
| NO.8 | #17~64 | 711 | 721 | 10G | 10G DUMMY SIGNAL |
| NO.8 | #17~64 | 722 | 732 | 10G | 10G OVERHEAD |

Rows NO.1–NO.6: TIMING INFORMATION OTHER THAN OVERHEAD OF THE FRAME
Rows NO.7–NO.8: TIMING INFORMATION RELATING TO OVERHEAD SECTION OF NEXT FRAME

FIG. 11B

| | ONU NUMBER | START | END | SIGNAL | REMARKS |
|---|---|---|---|---|---|
| NO.1 | #33 | 11 | 66 | 10G | PRIORITY 1 |
| NO.2 | #34 | 67 | 122 | 10G | PRIORITY 3 |
| NO.3 | #35 | 123 | 178 | 10G | PRIORITY 4 |
| NO.4 | #1~17 | 179 | 189 | 1G | 1G DUMMY SIGNAL |
| NO.5 | #1 | 190 | 245 | 1G | PRIORITY 2 |
| NO.x-1 | #17~64 | 700 | 710 | 10G | 10G OVERHEAD |
| NO.x | #1~16 | 900 | 910 | 1G | 1G OVERHEAD |

Rows NO.1–NO.5: TIMING INFORMATION OTHER THAN OVERHEAD OF THE FRAME

Rows NO.x-1, NO.x: TIMING INFORMATION RELATING TO OVERHEAD SECTION OF NEXT FRAME

FIG.11C

PASSIVE OPTICAL NETWORK SYSTEM AND OPTICAL LINE TERMINATOR

BACKGROUND OF THE INVENTION

1. Field of the Invention

The present invention relates to a passive optical network system and an optical line terminator, and particularly to a passive optical network system in which plural subscriber connecting equipments share an optical transmission line and an optical line terminator.

2. Description of the Related Art

In order to transmit and receive a large volume of image signals and data through a communication network, speed-up and broadening of the communication network is performed also in an access network for connecting a subscriber to the communication network, and the introduction of a passive optical network system (hereinafter referred to as PON) specified by Recommendation G.984.1-3 or the like of International Telecommunication Union (hereinafter referred to as ITU-T) is performed. The PON is a system in which an optical line terminator (hereinafter referred to as OLT) connected to an upper communication network and optical network units (hereinafter referred to as ONUs) containing terminals (PCs or phones) of plural subscribers are connected to each other through a passive optical network including a trunk optical fiber, an optical splitter and plural branch optical fibers. Specifically, communication is performed in such a form that signals from terminals (PCs etc.) connected to the respective ONUs are sent, as optical signals, from the branch optical fibers to the trunk optical fiber through the optical splitter, are optically (time division) multiplexed on the trunk optical fiber, and are sent to the OLT, and the OLT performs communication processing on the signals from the respective ONUs and sends them to the upper communication network, or sends them to another ONU connected to the OLT.

The development and introduction of the PON starts from a system to handle a low speed signal of, for example, 64 kbit/sec, and the introduction of Broadband PON (BPON) to transmit and receive a fixed length ATM cell at a maximum speed of about 600 Mbit/sec, Ethernet (registered trademark) PON (EPON) to transmit and receive a variable length packet of Ethernet at a maximum speed of about 1 Gbit/sec, or Gigabit PON (GPON) which handles a higher speed signal of about 2.4 Gbit/sec and is standardized by ITU-T Recommendation G.984.1, G.984.2 and 984.3 is advanced. Further, in future, a high speed PON which can handle a signal of 10 Gbit/sec to 40 Gbit/sec is requested to be realized. As means for realizing such high speed PON, multiplexing methods such as Time Division Multiplexing (TDM) to time-division multiplex many signals, Wavelength Division Multiplexing (WDM) to wavelength-multiplex them, and Code Division Multiplexing (CDM) to code-multiplex them are studied. Incidentally, the present PON adopts the TDM, and for example, the GPON has such a structure that different wavelengths are used between the upstream (from the ONU to the OLT) signal and the downstream (from the OLT to the ONU) signal, and with respect to the communication between the OLT and the respective ONUs, signal communication time is assigned to each ONU. Besides, from the structure of the related art in which fixed length signals are processed, the structure becomes such that burst-like variable length signals (burst signals) in which more various signals (audio, image, data, etc.) are easily handled are also processed. With respect to a future high speed PON, although various multiplexing methods are studied as described above, the study in the direction of adopting the TDM becomes main.

In the mode of each of the PONs, since the ONUs are installed in subscriber homes existing at various places, the distances from the OLT to the respective ONUs are different from each other. That is, since the length (transmission distance) of the optical fiber including the trunk optical fiber and the branch optical fiber from the OLT to each ONU varies, a transmission delay between the OLT and each ONU varies. Thus, even if the respective ONUs transmit signals at different timings, there is a possibility that the optical signals outputted from the respective ONUs collide and interfere with each other on the trunk optical fiber. Thus, in each of the PONs, the distance between the OLT and the ONU is measured by using, for example, the technique called ranging as specified in Chapter 10 of G.984.3, and the delays of the output signals of the respective ONUs are adjusted so that the signal outputs from the respective ONUs do not collide with each other.

Further, when the OLT determines the bandwidths of signals, which are allowed to be transmitted by the ONUs, based on transmission requests from the respective ONUs by using the technique called dynamic bandwidth assignment (hereinafter referred to as DBA), the delay amounts measured by the ranging are also considered, and the transmission timings are specified for the respective ONUs so that the optical signals from the respective ONUs do not collide and interfere with each other on the trunk optical fiber. That is, the PON is structured such that the operation of communication is performed in the state where the timings of signals transmitted and received between the OLT and the respective ONUs are managed in the system.

In the transmission and reception of signals between the OLT and the respective ONUs, for example, according to the regulation in Chapter 8.3.3 of G.984.2, at the head of the signal from each ONU, a guard time for interference prevention including a maximum of 12 bytes, a preamble used for determination of a signal identification threshold of a receiver in the OLT and for clock extraction, a burst overhead byte called a delimiter to identify a separator between received signals, and a control signal (also called an overhead or a header) of the PON are added to data (also called payload), so that the OLT can identify and process the signals sent from the respective ONUs and multiplexed on the trunk optical fiber. Incidentally, since the respective data are variable length burst data, a header called a G-PON Encapsulation Method (GEM) header for processing the variable length data is also added to the head of each data. With respect to a signal from the OLT to each ONU, at the head of the signal transmitted from the OLT to each ONU, a frame synchronization pattern to identify the head, a PLOAM field to transmit monitor, maintenance and control information, and an overhead (also called a header) called a grant designation field to instruct signal transmission timing of each ONU are added to data time-division multiplexed for each ONU, so that each ONU can identify and process the signal from the OLT. Incidentally, similarly to the signal from the ONU, a GEM header for processing variable length data is added to the data multiplexed for each ONU. The OLT uses the grant designation field and assigns an upstream transmission allowance timing (transmission start (Start) and stop (Stop)) of each ONU to each ONU in units of bytes. The transmission allowance timing is called the grant. When the respective ONUs transmit data to the OLT at the allowance timings, these are optically (time division) multiplexed on the optical fiber and are received by the OLT.

Non-patent document 1: ITU-T Recommendation G.984.1
Non-patent document 2: ITU-T Recommendation G.984.2
Non-patent document 3: ITU-T Recommendation G.984.3

SUMMARY OF THE INVENTION

In the PON, signals from the OLT to the plural ONUs are time-division multiplexed and are transmitted to all the ONUs. That is, even if the bandwidth (signal amount) of the signal provided to each ONU is small, each ONU once receives all communication signals from the OLT to the respective ONUs, identifies the communication content to the ONU itself by using a header (specifically, PORT ID of GEM header for GPON, identifier of ONU called LLID for EPON), captures only the identified signal into the inside of the ONU, and transfers it to the apparatus of the subscriber (user). As described above, in the PON, like the transition from the BPON to the GPON, the development and introduction is advanced from one to process low speed signals to one to process higher speed signals. Although the respective PONs are standardized, and consideration is made to absorb the old PON with respect to the transmission speed of signals, exchange of control signals and the protocol, the compatibility is not completely established, and in the present circumstances, the respective PONs are determined in different forms. Thus, by the expansion of communication service capacity, when it becomes necessary for the ONU to support a speed higher than the transmission speed supported by the related art, it is necessary to adopt (exchange) a new PON in which the transmission speed of the whole PON is increased, for example, the BPON is replaced by the GPON. That is, it is necessary to exchange the OLT and all the ONUs connected to the OLT by new equipments in conformity with the PON in which the transmission capacity is newly expanded.

When the introduction and the use form of the PON is considered, it is conceivable that although needs for provision of higher speed service capacity are increased, all the needs are not instantaneously changed, and partial users start to use, and the users are gradually increased. During this period, there are many subscribers who satisfy the existing PON. As described above, to exchange the existing PON for a new PON is to exchange all the OLT and the ONUs, and a large cost is required for the exchange. Besides, when the substance of the expansion of the communication service capacity is considered, equipments which are not required for a user are also exchanged, and a relatively high cost burden is probably imposed on a carrier who introduces the PON or users who use the PON. Thus, a PON having such a structure that plural PONs different in regulation and performance are mixed and can be operated, and its communication method are requested, for example, equipments of PONs different in transmission speed are mutually connected, or a shift to a new PON can be performed while existing equipments of a PON are contained.

Here, when PONs of plural transmission speeds including a high speed signal, a low speed signal and the like are mixed, at the time of signal transmission, it is conceivable that optical levels are different due to a difference in bit rate of the optical signal. At this time, the ONU at the reception side generally requires a pull-in time of several hundred nanoseconds in order to follow a variation in level of an input signal. When each ONU under the OLT can not follow the variation in the level of the input signal (received signal), there is a case where immediately after the transmission speed is switched and before the ONU follows the variation in the level of the received signal, partial data causes a reception error. In order to solve this problem, it is sufficient if a high-performance receiver capable of dealing with the switching of the transmission speed is adopted at the ONU side, however, there is a problem that the cost of the ONU itself is increased.

In view of the above, it is an object of the invention to provide a passive optical network system including an OLT having such a structure that PONs of plural specifications (regulations) different in transmission speed are mixed and can be operated and ONUs each capable of transmitting and receiving at one transmission speed, and an optical line terminator. More specifically, one of the objects of the invention is to provide a passive optical network system and an optical line terminator in which in the PON to perform communication of signals between the OLT and respective ONUs by time division multiplexing, the plural ONUs different in signal transmission speed are mixedly contained and can be operated. Besides, one of the objects of the invention is to provide a frame structure in which an OLT mixedly transmits frames different in transmission speed, and at the time of frame switching of the respective transmission speeds, the ONU can follow a variation in received signal level due to a variation in optical level at the time of reception. Further, one of the objects of the invention is to enable each ONU to transmit and receive a frame of transmission speed which can be handled by the ONU itself without error.

Besides, one of the objects of the invention is to suppress the cost of exchange of a communication apparatus by exchanging only a corresponding OLT and an ONU even if a request for expansion of communication service capacity occurs. Besides, one of the objects of the invention is, in an ONU to receive downstream signals in which a high speed signal and a low speed signal are mixed, to eliminate the necessity of adopting a high-performance component capable of performing high speed response to a level variation and to enable mixed signals to be transmitted and received by a more inexpensive ONU.

A signal to be transmitted and received between the OLT of the PON and each ONU is subjected to a start-up operation such as correction of transmission timing according to the distance as stated above, and then shifts into a service state. In the service state (normal operation time), high speed service is provided according to the user's request or contract.

The PON is operated in a state where transmission and reception timings of signals are controlled based on the technique of the ranging or DBA. Accordingly, even if data of plural speeds are mixed, those positions (transmission and reception timings) are grasped and the data can be processed. That is, when each ONU can understand the arrival timing of data of transmission speed which can be received by the ONU itself or the timing when a frame to the ONU itself reaches, communication is possible without error.

In the invention, attention is paid to the above characteristic of the PON, and in order to achieve the objects, when plural ONUs different in signal transmission speed are mixedly contained, an OLT generates a frame in which data of transmission speeds suitable for the respective ONUs are mixed, and a dummy signal is arranged between the signals of the respective transmission speeds in order to secure a time in which the ONU can follow, and the frame has a structure to notify arrival timings of the signals for the respective transmission speeds.

Specifically, before the PON shifts to the normal operation, ranging is performed for each transmission speed, and the OLT grasps the transmission speeds of the respective client ONUs. At this time, the threshold (or ratio) of data storage amount for each transmission speed at the time of the normal operation and at the time of downstream signal transmission is determined. When a frame is transmitted to each ONU corresponding to each transmission speed at the time of the normal operation, data to each ONU transmitted from the upper network is checked against the found transmission speed of each ONU, conversion to the transmission speed suitable for each ONU is performed in the OLT, and a frame in which a high speed and a low speed are mixed is generated. At this time, the priority of the data transmitted from the upper network is determined, and for example, the frame structure is made such that the data of the respective transmission speeds are stored in descending order of priority within the range of not exceeding the threshold. Besides, at the time of switching of the respective transmission speeds, in order to enable the ONU to follow the variation in received signal level due to the change of the transmission speed (variation in optical level), a dummy signal irrelevant to the original data is added. Since this dummy signal is data irrelevant to the original data transmission, the amount of insertion is made necessity minimum. Timing information of a high speed portion and a low speed portion of the frame construed at this time is called a downstream band width (BW) map, is added to the overhead of each transmission speed and is transferred to each client ONU.

By this structure, even in the case where a frame in which different transmission speeds are mixed is transferred, each ONU can follow each transmission speed by the effect of the dummy signal, and based on the notification of the downstream BW map, at the time of arrival of a next frame, a receiving operation can be performed without error at the timing when the frame of the corresponding transmission speed arrives, or the timing for the ONU itself. By this structure, each ONU can receive the objective frame without detecting an error. Besides, based on a grant designation given to a header, the OLT switches a receiver for each transmission speed at the time of reception of signals from the respective ONUs different in transmission speed, and performs communication at different transmission speeds.

The passive optical network system is, for example, a passive optical network system in which a master station and plural slave stations different in transmission speed are connected through an optical fiber network including an optical splitter, and in the passive optical network system, the slave stations include a slave station capable of transmitting and receiving only first data of a first transmission speed, and a slave station capable of transmitting and receiving only second data of a second transmission speed higher than the first transmission speed and are connected to the master station, the master station transmits the first data of the first transmission speed and the second data of the second transmission speed higher than the first transmission speed to the slave stations, and the master station includes:

an adjustment circuit that can grasp transmission speed information which can be transmitted and received by the respective slave stations before a normal operation and determines a threshold of a transmission amount at each transmission speed at the time of data transmission (ONU transmission speed information storage and threshold determination section);

an adjustment circuit to check data to the respective slave stations (priority-specific queue information monitor section), an insertion circuit to insert a dummy signal to enable the slave station to perform reception without error between the data of the plural transmission speeds (dummy signal generation section);

an adjustment circuit to check the data to the respective slave stations against the transmission speed information of the respective slave stations and to adjust a transmission timing (downstream BW map table generation section or downstream BW map generation section); and an assembling circuit to convert the received data to have a suitable transmission speed based on the timing (downstream 1 G/10 G signal switching section), and the master station converts destination of received data to a suitable transmission speed based on the adjustment circuit to check the data to the respective slave stations against the transmission speed information of the respective slave stations, time-division multiplexes the first data or the second data, and transmits the frame at the specified timing to the plural slave stations.

In the passive optical network system, the master station includes an adjustment circuit that can grasp the transmission speed information of the slave station capable of transmitting and receiving only the single transmission speed, and determines the ratio of assignment of a bandwidth for each transmission speed at transmission to the slave station, when transmitting the data in which the plural transmission speeds are mixed to the plural slave stations, the master station checks the transmission speed information of the respective slave stations against the destination of the data sent from the upper layer of the master station, takes the ratio of the assignment of the bandwidth determined by the adjustment circuit into consideration to obtain the arrival timing of the data of the plural transmission speeds in the respective slave stations, and generates the data in the overhead used for control, and based on the timing information, the master station converts the data to have the transmission speed at which the respective slave stations can receive, and assembles the time-division multiplexed frame.

In the passive optical network system, the master station includes a switching control section that, when data transmitted from the plural slave stations are received, refers to the transmission timings generated by the master station and sent from the respective slave station, estimates the arrival transmission speed based on the transmission timing, and performs switching.

According to the first solving means of this invention, there is provided a passive optical network system comprising:

a master station to time-division multiplex signals of a first transmission speed and a second transmission speed and to perform communication;

plural slave stations including a first slave station to communicate with the master station at the first transmission speed and a second slave station to communicate with the master station at the second transmission speed; and an optical fiber network in which the signals from the master station are transmitted to the respective slave stations through a splitter, wherein each of the plural slave stations includes an automatic gain adjustment circuit to follow a change in level of a received signal due to a change in transmission speed of a multiplexed signal and adjusts the received signal to a specified level, and wherein the master station time-division multiplexes payload and/or overhead information of the first transmission speed, payload and/or overhead information of the second transmission speed, and a dummy signal inserted at a place where the transmission speed is changed, and transmits multiplexed information and signal to the slave stations.

According to the second solving means of this invention, there is provided an optical line terminator in a passive optical network system including the optical line terminator to time-division multiplex signals of a first transmission speed and a second transmission speed and to perform communication, plural optical network units including a first optical network unit to communicate with the optical line terminator at the first transmission speed and a second optical network unit to communicate with the optical line terminator at the second transmission speed, and an optical fiber network in which the signals from the optical line terminator are transmitted to the respective optical network units through a splitter, wherein each of the optical network units includes an automatic gain adjustment circuit to follow a change in level of a received signal due to a change in transmission speed of a multiplexed signal and to adjust the received signal to a specified level, and the optical line terminator comprises:

a frame assembling section to generate a frame in which payload and/or overhead information of the first transmission speed, payload and/or overhead information of the second transmission speed, and a dummy signal inserted to a place where the transmission speed is changed are time-division multiplexed; and a transmission section to convert the frame generated by the frame assembling section into an optical signal and to transmit the optical signal to the optical line terminator.

According to the invention, it is possible to provide a passive optical network system including an OLT having such a structure that PONs of plural specifications (regulations) different in transmission speed are mixed and can be operated and ONUs each capable of transmitting and receiving at one transmission speed, and an optical line terminator. More specifically, according to the invention, it is possible to provide a passive optical network system and an optical line terminator in which in the PON to perform communication of signals between the OLT and respective ONUs by time division multiplexing, the plural ONUs different in signal transmission speed are mixedly contained and can be operated. Besides, according to the invention, it is possible to provide a frame structure in which an OLT mixedly transmits frames different in transmission speed, and at the time of frame switching of the respective transmission speeds, the ONU can follow a variation in received signal level due to a variation in optical level at the time of reception. Further, according to the invention, it is possible to enable each ONU to transmit and receive a frame of transmission speed which can be handled by the ONU itself without error.

Besides, according to the invention, it is possible to suppress the cost of exchange of a communication apparatus by exchanging only a corresponding OLT and an ONU even if a request for expansion of communication service capacity occurs. Besides, according to the invention, it is possible, in an ONU to receive downstream signals in which a high speed signal and a low speed signal are mixed, to eliminate the necessity of adopting a high-performance component capable of performing high speed response to a level variation and to enable mixed signals to be transmitted and received by a more inexpensive ONU.

BRIEF DESCRIPTION OF THE DRAWINGS

FIG. 4A to 4C are table structural view showing a correspondence between an ONU and a transmission speed, which are generated by an ONU transmission speed information storage section or an ONU transmission speed information storage and threshold determination section.

FIG. 10 is a table structural view showing a structural example of a grant designation.

FIG. 11A is a table structural view of a structural process of a downstream BW map.

FIG. 11B is a table structural view 1 showing a structural example of the downstream BW map.

FIG. 11C is a table structural view 2 showing a structural example of the downstream BW map.

DETAILED DESCRIPTION OF THE INVENTION

Hereinafter, a structure and an operation of a PON according to an embodiment will be described in detail with reference to the drawings, while using, as an example, a structure and an operation of a PON in which a GPON specified by ITU-T Recommendation G.984 and a 10 G PON, which is a next-generation PON expected to be introduced in future and has an increased transmission speed, are mixed.

In the following description, similarly to the GPON, the PON is assumed to have a structure in which variable length data is time-division multiplexed and processed. A description will be made while using an example in which the transmission speed of downstream data from an OLT to each ONU is 1 Gbit/sec (although it is 1.24416 Gbit/sec, hereinafter simplified as 1 Gbit/sec or 1 G) for the GPON, and 10 Gbit/sec (although it is 9.95328 Gbit/sec, hereinafter similarly referred to as 10 Gbit/sec or 10 G) for the 10 GPON. Besides, a description will be made while using an example in which the transmission speed of upstream data from the ONU to the OLT is 1 Gbit/sec (although it is 1.24416 Gbit/sec, hereinafter simplified as 1 Gbit/sec or 1 G) for the GPON, and 5 Gbit/sec (although it is 4.97664 Gbit/sec, hereinafter similarly referred to as 5 Gbit/sec or 5 G) for the 10 GPON. Incidentally, the numerical values of the transmission speed and the like are merely examples, and the embodiment is not limited to the numerical values.

(Whole Structure)

Figure 1:
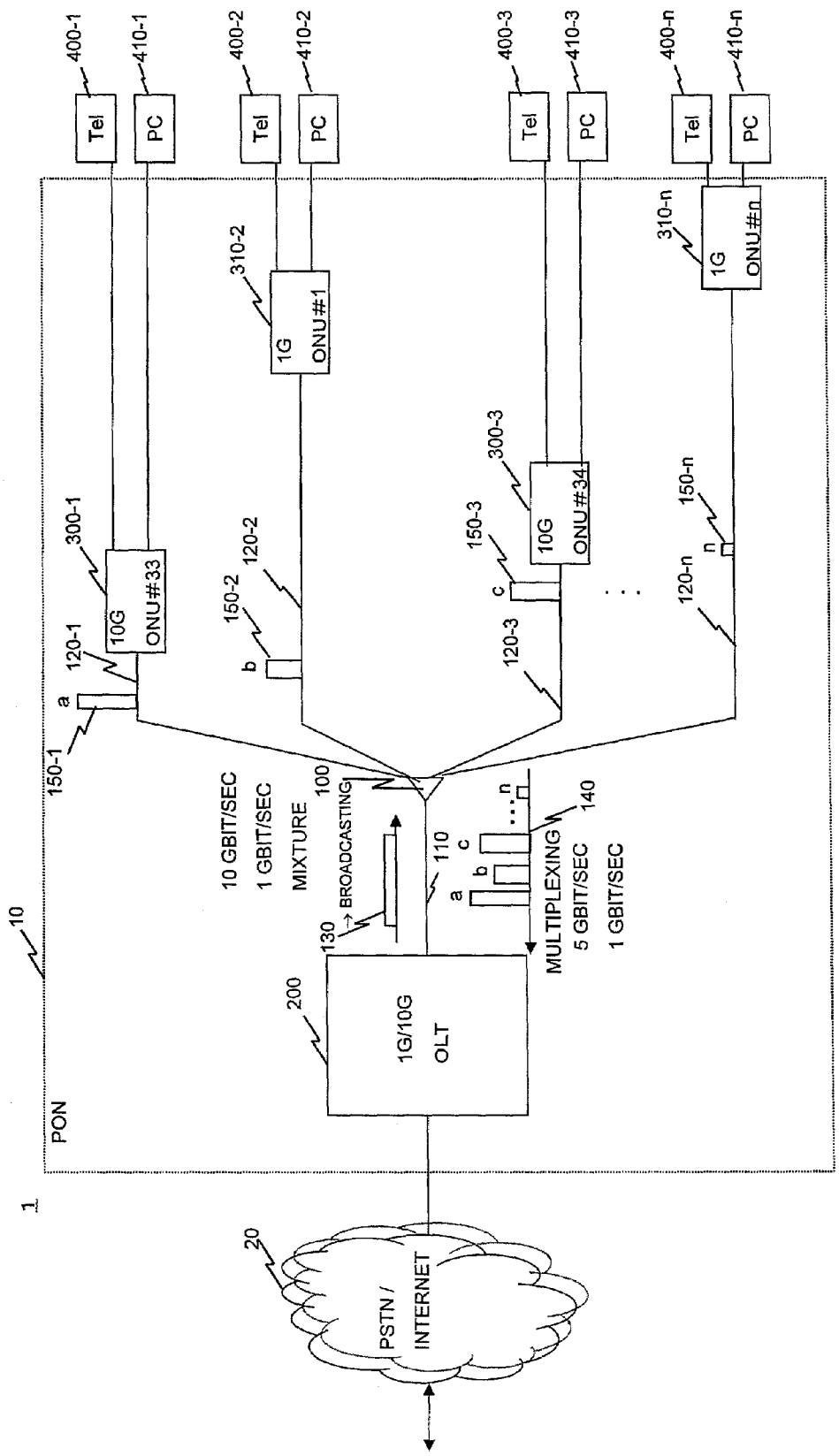
FIG. 1 is a network structural view showing a structural example of an optical access network using a PON.

FIG. 1 is a network structural view showing a structural example of an optical access network using a PON.

An access network 1 is a network in which a public communication network (PSTN)/Internet 20 (hereinafter also called an upper network) as an upper communication network and a subscriber terminal (Tel: 400, PC: 410, etc.) are connected through a PON 10 and communication is performed. The PON 10 includes an OLT (hereinafter also called a master station) 200 connected to the upper network 20, and plural ONUs (hereinafter also called slave stations) 300 and 310 containing subscriber's terminals (telephone (Tel) 400, PC 410, etc.). The OLT 200 and the respective ONUs 300 and 310 are connected through a passive optical network including a trunk optical fiber 110, an optical splitter 100 and plural branch optical fibers 120, and communication between the upper network 20 and the subscriber terminals 400 and 410, or between the subscriber terminals 400 and 410 is performed.

The ONU 300 is the ONU of 10 GPON (10 Gbit/sec in downstream), and the ONU 310 is the ONU of GPON (1 Gbit/sec in downstream). In accordance with the present Recommendation G.984, even in the case where the two types of ONUs are mixed, up to 64 ONUs 300/310 can be connected to the OLT 200. In the example of FIG. 1, the four ONUs 300 or 310 are illustrated, and ONU #33, #34 (300-1, 300-3) of 10 G capable of receiving data at a transmission speed of 10 Gbit/sec in downstream data signal and ONU #1, #n (310-2, 310-n) of 1 G capable of receiving data at a transmission speed of 1 Gbit/sec in downstream data signal are mixed and connected to the OLT 200.

Although the details will be described later, a downstream signal 130 transmitted in a direction from the OLT 200 to the ONUs 300/310 stores an overhead and a frame payload for each transmission speed, and a dummy signal is inserted at a place where the respective transmission speeds are changed. Signals to the respective ONUs 300/310 are time-division multiplexed and are broadcasted. Each of the ONUs 300/310 determines whether the received signal has its own transmission speed or is the signal to itself, and sends the received signal to the telephone 400 or the PC 410 based on the destination of the signal. Besides, in an upstream direction from the ONU 300/310 to the OLT 200, an upstream signal 150-1 transmitted from the ONU 300-1, an upstream signal 150-2 transmitted from the ONU 310-2, an upstream signal 150-3 transmitted from the ONU 300-3, and a signal 150-n transmitted from the ONU 310-n become an optically time-division multiplexed signal 140 through the optical splitter 100, and is transmitted to the OLT 200. Incidentally, since fiber lengths between the OLT 200 and the respective ONUs 300/310 are different from each other, the signal 140 has a form in which signals different in amplitude are multiplexed.

Incidentally, for example, an optical signal of a wavelength band of 1.5 μm is used as the downstream signal 130, an optical signal of a wavelength band of 1.3 μm is used as the upstream signal 140/150, and both the optical signals are wavelength division multiplexed (WDM) and can be transmitted and received through the same optical fibers 110 and 120.

(Signal Structure)

Figure 5A:
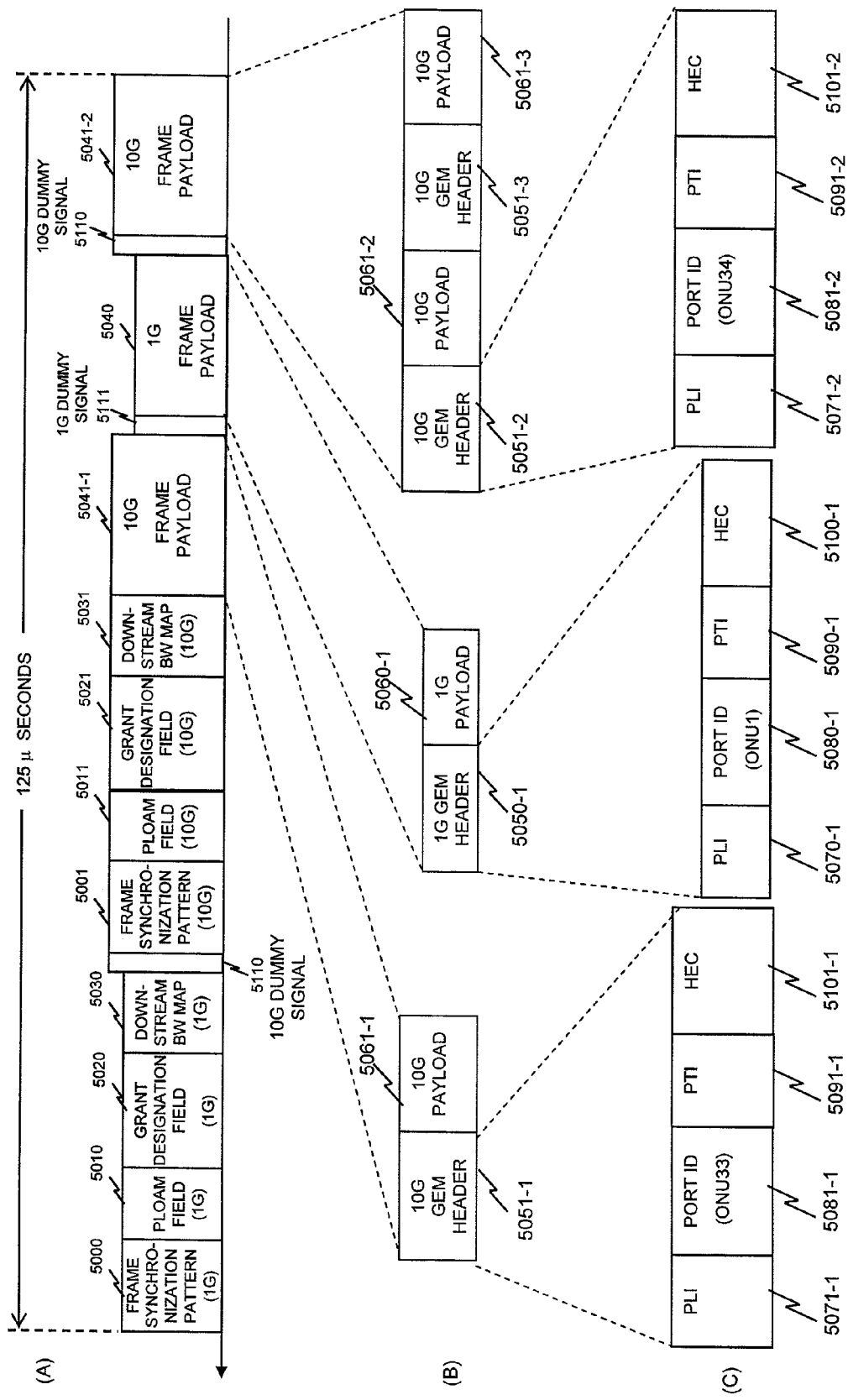
FIG. 5A is a signal structural view 1 showing a structural example of an optical signal from an OLT to an ONU.
Figure 5B:
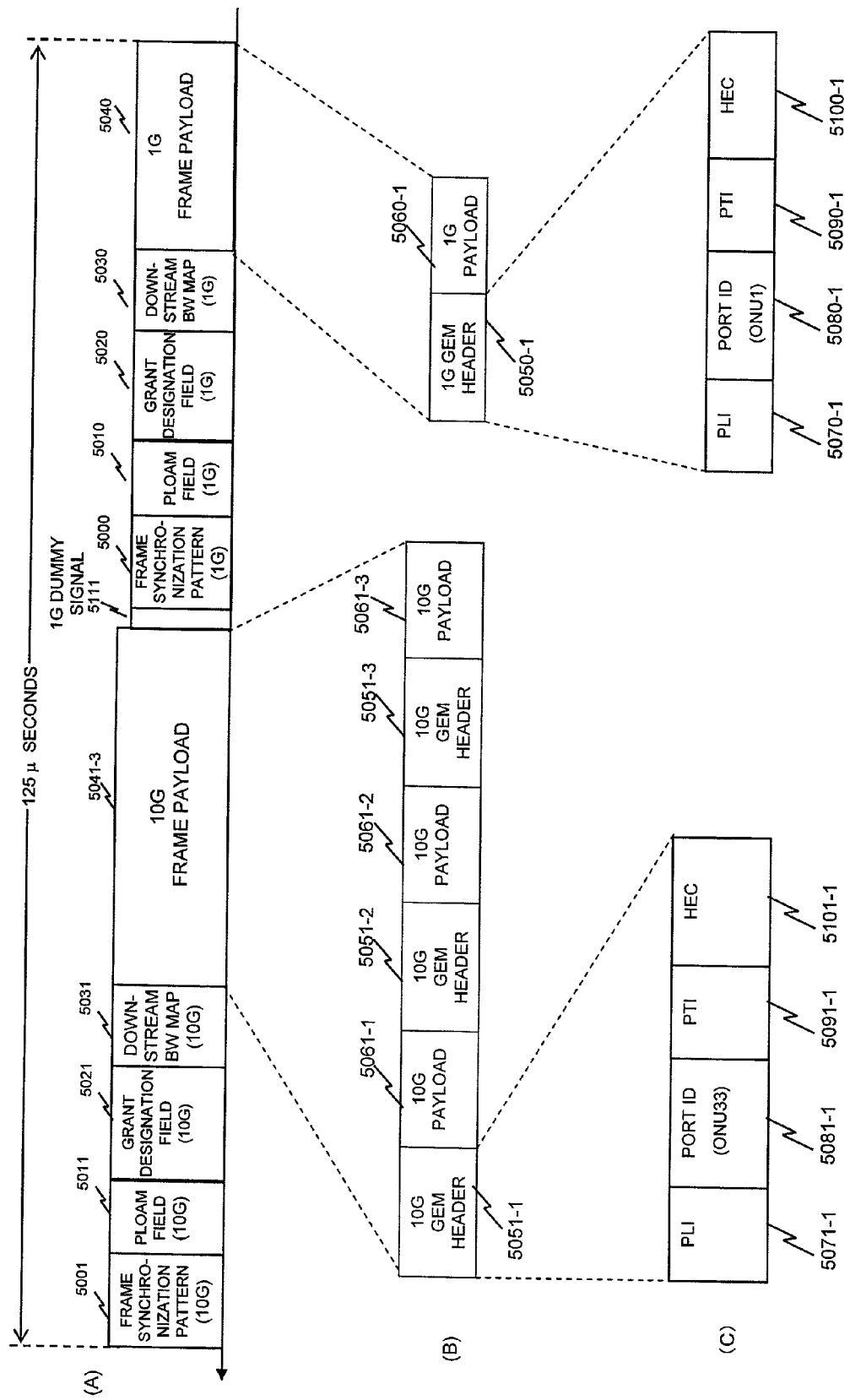
FIG. 5B is a signal structural view 2 showing a structural example of the optical signal from the OLT to the ONU.

FIG. 5A and FIG. 5B are respectively signal structural views of optical signals from the OLT to the ONU.

Although the structure of an optical signal of the 10 G PON is not yet specified at present, since both the GPON and the 10 G PON handle variable length data, it is conceivable to be realistic (practical) that signals of the respective speeds are handled by time-division multiplexing using a signal structure similar to the GPON specified by Recommendation at present. Accordingly, in the following embodiment, the operation of the PON will be described based on the signal structure specified in the GPON. Of course, the signal structure and the operation of the PON are examples, and the embodiment is not limited to the structure and the operation. Besides, the difference between the structures of FIG. 5A and FIG. 5B is due to the difference of a downstream BW map used in the process of generation of the downstream signal 130 described later.

Each of the signals from the OLT 200 to the respective ONUs 300/310 is called the downstream signal 130, and as shown in FIG. 5A(A) and FIG. 5B(A), for example, a frame of 125 microseconds includes an overhead and a payload. The overhead includes, with respect to each of the transmission speeds, a frame synchronization pattern 5000/5001 by which the ONU 300/310 finds the head of the signal, a PLOAM field 5010/5011 to transmit information relating to monitor, maintenance and control of the ONU 300/310, a grant designation field 5020/5021 to specify an upstream signal transmission timing to the OLT 200 from the ONU 300/310, and a downstream BW map 5030/5031 indicating timing information of a frame payload 5040/5041 of each transmission speed of the frame, timing information of an overhead of each transmission speed in a frame of 125 microseconds next received by the ONU 300/310, and timing information of a dummy signal 5110/5111 provided to enable the ONU 300/310 to follow a variation in received signal level due to a change in transmission speed (variation in optical level). The payload has such a structure that a 1 G frame payload 5040 and a 10 G frame payload 5041 obtained by time-division multiplexing the data to the ONU 300/310 are stored, and the dummy signal 5110/5111 is inserted between the overheads of the respective transmission speeds and between the frame payloads of the respective transmission speeds. The downstream signal 130 is broadcasted to the respective ONUs 300/310. From the information obtained from the downstream BW map of the overhead, each of the ONUs 300/310 determines the timing when the received signal of the transmission speed corresponding to the ONU itself arrives or whether the received signal is the signal for the ONU itself, performs various operations explained in a structural example of the ONU shown in FIG. 15 or FIG. 16, and transmits the received data to the destination terminal 400 or 410.

FIG. 5A(B) and FIG. 5B(B) are structural views showing detailed structures of the frame payloads 5040/5041 of the respective transmission speeds. Data (10 G payload 5061 and 1 G payload 5060) to the respective ONUs 300/310 are time-division multiplexed in the respective frame payloads 5040/5041 in a form that GEM headers (10 G GEM header 5051 and 1 G GEM header 5050) used for data reception in the respective ONUs, such as data identifiers for the respective ONUs, are added. FIG. 5A(C) and FIG. 5B(C) are structural views showing structures of the GEM headers 5050/5051. The details of respective bytes are specified in Recommendation G.984, and their description will be omitted.

Figure 6:
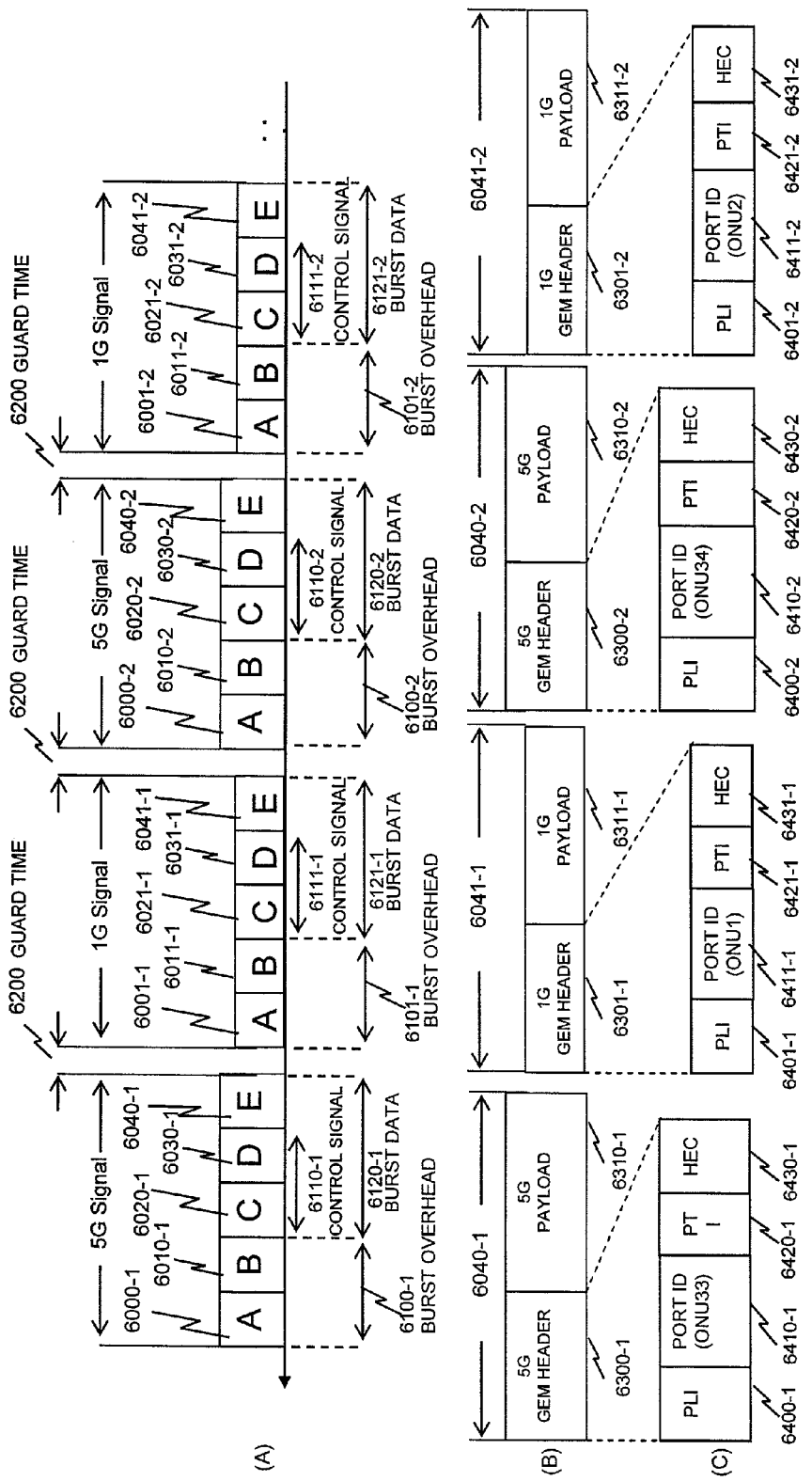
FIG. 6 is a signal structural view showing a structural example of an optical signal from the ONU to the OLT.

FIG. 6 is a signal structural view showing a structural example of an optical signal from the ONU to the OLT.

The signal from each of the ONUs 300/310 to the OLT 200 is called the upstream signal 150, and includes, as shown in FIG. 6(A), burst data 6120/6121 and burst overhead 6100/6101. The burst data 6120/6121 includes a control signal 6110/6111 including a PLOAM field 6020/6021 for transmitting information relating to monitor, maintenance and control of the ONU 300/310 and a queue length field 6030/6031 for notifying the OLT 200 of the amount of data transmission of which the ONU 300/310 waits for, and a variable length frame payload 6040/6041 in which data from the terminal 400 or 410 of the ONU is included. The burst overhead 6100/6101 includes a preamble field 6000/6001 in which the OLT 200 recognizes and processes the burst data 6120/6121 from the ONU 300/310, and a delimiter field 6010/6011. Incidentally, a guard time 6200 shown before the preamble field 6000/6001 is a non-signal (optical signal OFF state) field for separating transmission signals from the respective ONUs, and the total of the guard time 6200 and the burst overhead 6100/6101 is specified to be 12 bytes at the most in Recommendation G.984. As shown in FIG. 1, the upstream signals from the respective ONUs 300/310 are time-division multiplexed on the trunk optical fiber 110 after passing through the optical splitter 100, become the multiplexed optical signal 140, and are transmitted to the OLT 200.

FIG. 6(B) is a structural view showing a detailed structure of the frame payload 6040/6041. Similarly to the downstream signal 130, data (1 G payload 6311 or 5 G payload 6310) from each of the ONUs 300/310 is time-division multiplexed in the frame payload 6040/6041 in the form in which a GEM header 6300/6301 used for data reception in the OLT 200, such as a data identifier for each ONU, is added. FIG. 6(C) is a structural view showing a structure of the GEM header 6300/6301. The details of the respective bytes are specified in Recommendation G.984, and their description will be omitted.

Incidentally, in the embodiment, the transmission timings of the upstream signals 150 from the respective ONUs 300/310 can be determined similarly to the GPON specified by ITU-T Recommendation G.984. Specifically, at the time of start-up of the PON system, control parameters necessary for system operation called ranging are decided, and are set in the OLT 200 and the respective ONUs 300/310, and then, the OLT 200 determines the data amount (bandwidth) allowed to be transmitted to the respective ONUs based on queue length reports received from the respective ONUs 300/310 and the allowance traffic based on a contract. The transmission allowance timings (grant designations) corresponding to the determined bandwidths are notified to the respective ONUs 300/310 by the grant designation field 5020/5021. The respective ONUs 300/310 transmit the upstream signals 150 to the OLT 200 at the timings.

(OLT)

Figure 7:
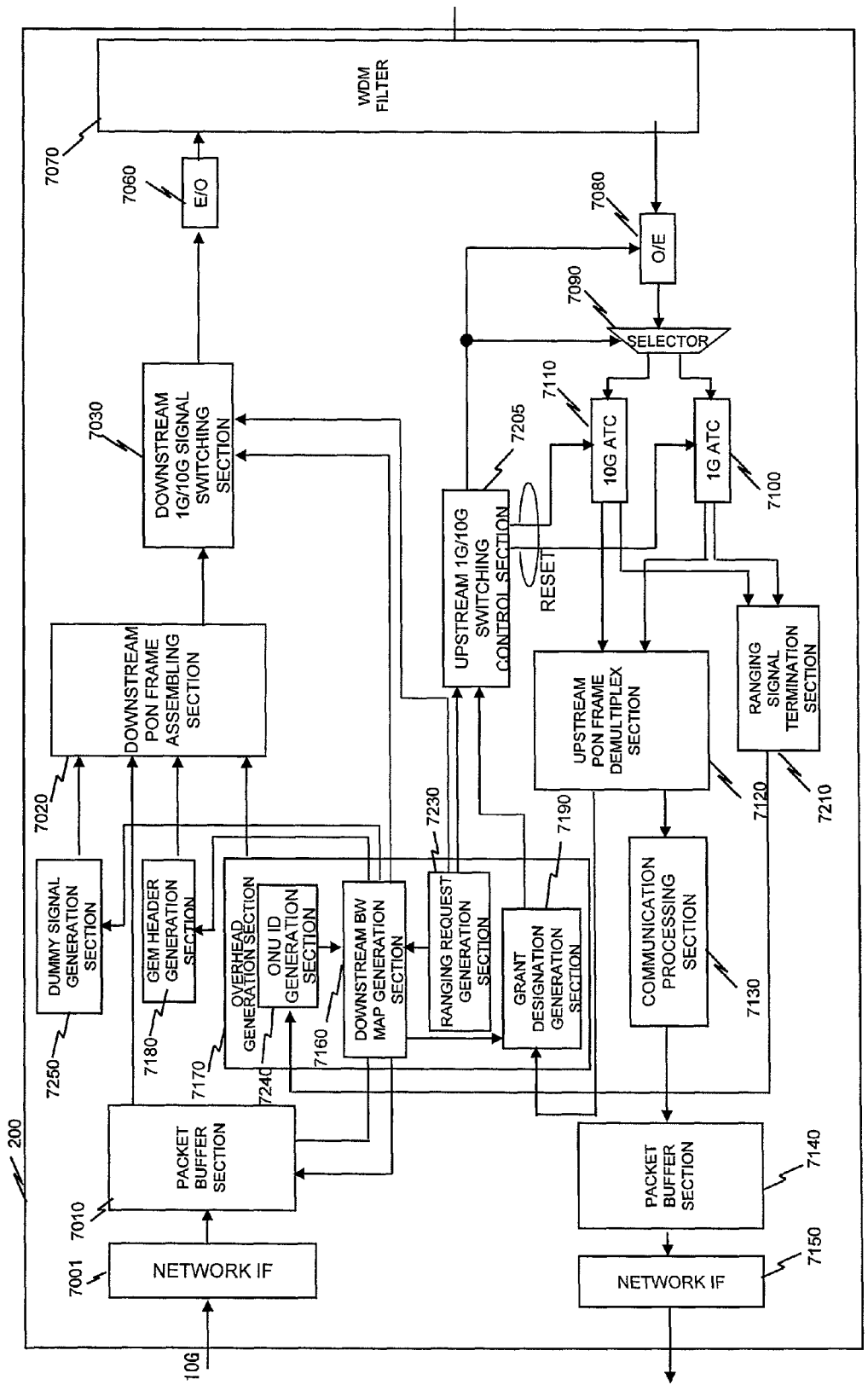
FIG. 7 is a block diagram showing a structural example of a 1 G/10 G OLT.

FIG. 7 is a block diagram showing a structural example of the OLT 200.

The OLT 200 includes, for example, a network IF 7001, a packet buffer section 7010, a GEM header generation section 7180, an overhead generation section 7170, a dummy signal generation section 7250, a down PON frame assembling section 7020, a down 1 G/10 G signal switching section 7030, an E/O 7060, a WDM filter 7070, an O/E 7080, a selector 7090, a 1 G ATC 7100, a 10 G ATC 7110, an upstream PON frame demultiplex section 7120, a communication processing section 7130, a packet buffer section 7140, a network I/F 7150, a ranging signal termination section 7210, and an upstream 1 G/10 G switching control section 7205. The downstream BW map generation section 7160 includes, as described later, a priority-specific queue information monitor section, a downstream BW map table generation section, and an ONU transmission speed information storage section or an ONU transmission speed information storage and threshold determination section.

The OLT 200 receives data of a transmission speed of 10 Gbit/sec to be transmitted to the respective ONUs 300/310 from the upper network 20 through the network IF 7001. The network IF 7001 is an interface to the upper network. The received data reaches the packet buffer section 7010, and is once stored in priority-specific queue buffers (7010-1 to 7010-n in FIG. 8A and FIG. 8B described later) therein. The assembly of the downstream PON frame is performed by the operation of the priority-specific queue buffers (7010-1 to 7010-n in FIG. 8A and FIG. 8B described later), the GEM header generation section 7180, the overhead generation section 7170, the dummy signal generation section 7250, and the downstream PON frame assembling section 7020 based on the downstream BW map (the details will be described later) generated by the downstream BW map generation section 7160. Thereafter, with respect to a signal in the downstream PON frame, which is generated based on the downstream BW map, the downstream 1 G/10 G signal switching section 7030 converts a necessary portion into a 1 G signal, and generates the downstream signal 130. The generated downstream signal 130 is transmitted to the respective ONUs 300/310 through the E/O 7060 to convert an electric signal into an optical signal and the WDM filter 7070.

When the upstream signal 140 shown in FIG. 1 is received, first, the signal passes through the WDM filter 7070, the O/E 7080 and the selector 7090. At this time, reference is made to the grant designation (FIG. 10) corresponding to the upstream signal 140, and the signal reaches the upstream PON frame demultiplex section 7120 through one of the 1 G ATC 7100 and the 10 G ATC 7110 according to the transmission speed. A reset signal is inserted into the respective ATCs at the time of arrival of the data of its own transmission speed. This reset signal has also such an effect that although the upstream signals (FIG. 1: 150) from the respective ONUs 300/310 are time-division multiplexed and received by the OLT 200, since the levels of optical signals vary, each time each of the upstream signals 150 is received, the signal reception level is reset by the reception circuit 7100 or 7110 of the OLT 200, and high-speed and accurate signal reception is performed. Thereafter, the upstream PON frame demultiplex section 7120 demultiplexes the upstream PON frame, and transfers the payload information to the communication processing section 7130. The communication processing section 7130 processes the transferred payload information to an Ethernet packet, transfers it to the packet buffer section 7140, and transmits it to the upper network through the network IF 7150.

Besides, the OLT 200 obtaining the queue length report generates a new grant designation. Specifically, the upstream PON frame demultiplex section 7120 sends the queue length report demultiplexed from the upstream PON frame to the grant designation generation section 7190. The queue length report contains the amount of information desired to be transmitted at the time of next transmission from the respective ONUs 300/310. The grant designation generation section 7190 generates the grant designation based on the information. Since a specific generating method is specified in G.984, its explanation will be omitted. At this time, for example, the ONU transmission speed information storage section of the downstream map generation section 7160 or the ONU transmission speed information storage and threshold determination section notifies the grant designation generation section 7190 of the transmission speed information (FIG. 4c) for each ONU. The grant designation specified in this embodiment is obtained by adding the transmission speed information for each ONU to the grant designation of the related art (FIG. 10). The upstream 1 G/10 G switching control section 7205 receiving this grant designation switches the O/E 7080, the selector 7090, the 1 G ATC 7100, and the 10 G ATC 7110 according to the receiving timing, so that the OLT 200 can receive the data from the respective ONUs 300/310 without error.

(ONU)

Figure 15:
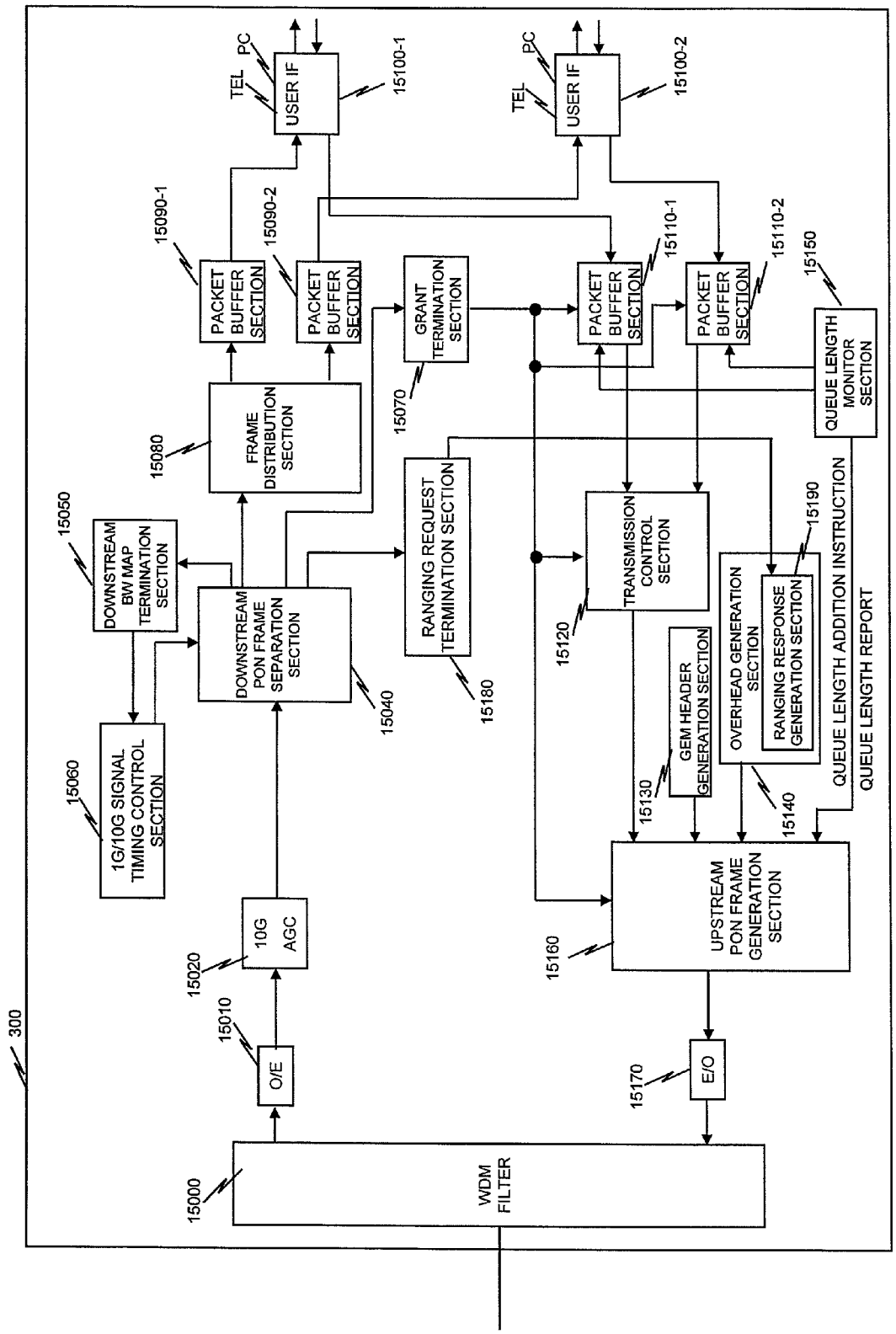
FIG. 15 is a block diagram showing a structural example of a 10 G ONU.
Figure 16:
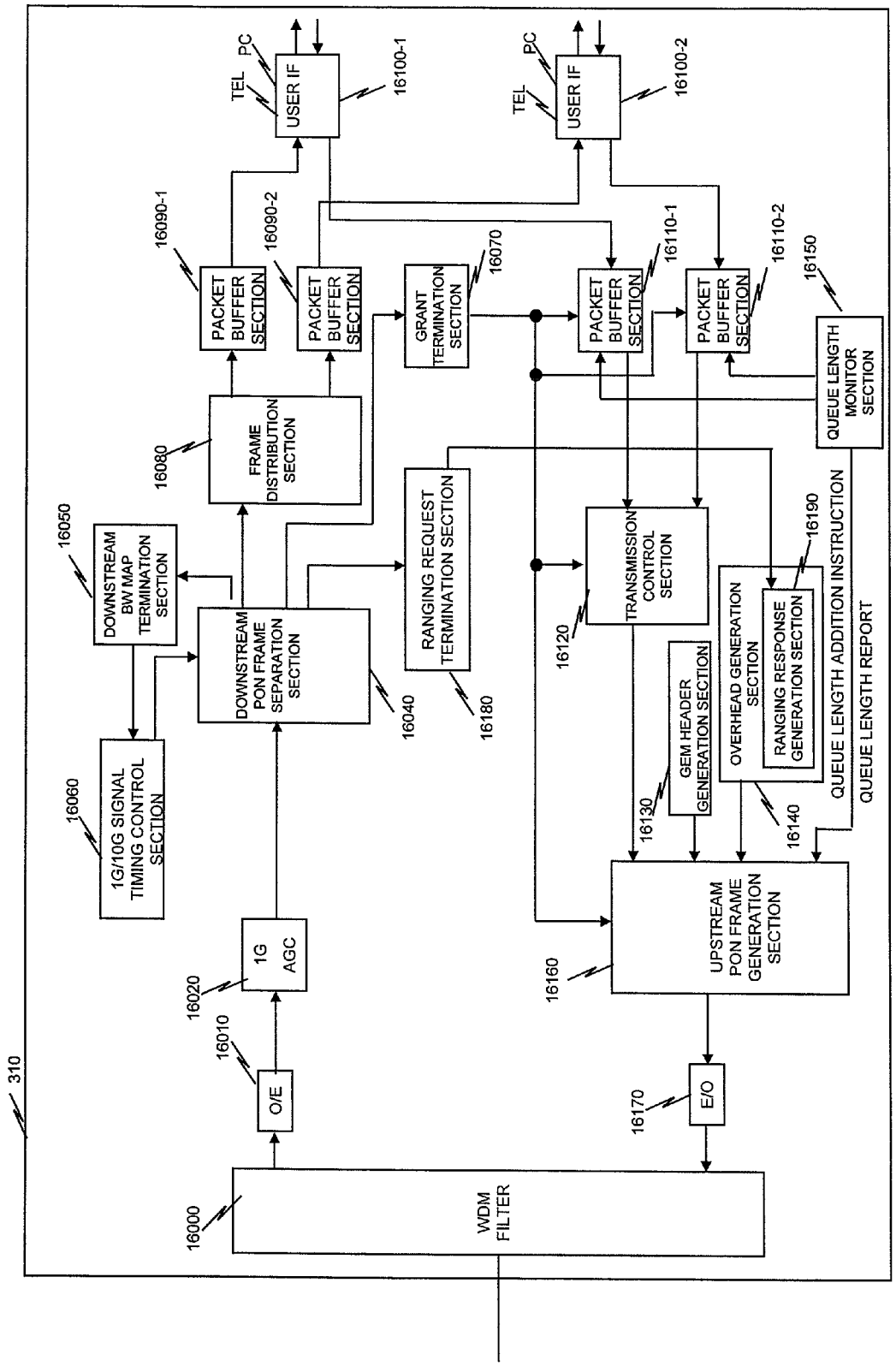
FIG. 16 is a block diagram showing a structural example of a 1 G ONU.

FIG. 15 is a block diagram showing a structural example of the 10 G ONU 300. FIG. 16 is a block diagram showing a structural example of the 1 G ONU 310.

Since the functions of respective blocks of the 1 G ONU 310 are the same as those of the 10 G ONU 300 except the difference in transmission speed, the 10 G ONU 300 will be described below, and the detailed description of the 1 G ONU 310 will be omitted.

The 10 G ONU 300 includes, for example, a WDM filter 15000, an O/E 15010, a 10 G AGC 15020, a downstream PON frame separation section 15040, a downstream BW map end section 15050, a 1 G/10 G signal timing control section 15060, a frame distribution section 15080, packet buffer sections 15090, 15110, user I/Fs 15100, a grant termination section 15070, a ranging request termination section 15180, a grant termination section 15070, a ranging request termination section 15180, a GEM header generation section 15130, an overhead generation section 15140, a queue length monitor section 15150, a transmission control section 15120, an upstream PON frame generation section 15160, and an E/O 15170. The overhead generation section 15140 includes a ranging response generation section 15190. The number of the packet buffer sections 15090, 15110 and the user IFs 15100 may be arbitrary.

First, the reception of the downstream signal will be described. The downstream signal 130 received from the branch optical fiber 120 is converted into an electric signal through the WDM filter 15000 by the O/E 15010 which converts an optical signal into an electrical signal. At the latter stage of the O/E 15010, there exists an automatic gain adjustment circuit called Automatic Gain Control (AGC) having a function to adjust a received signal to a constant level (10 G AGC 15020). In this embodiment, since the 1 G signal and the 10 G signal are mixed in the downstream signal 130, originally, unless the AGC has high performance, the switching of the received signal levels of the 1 G signal and the 10 G signal can not be immediately handled, and there is a case where an unreadable portion partially occurs. However, in the embodiment, since the dummy signal 5110/5111 is inserted into the downstream signal 130, the dummy signal flows until the switching is completed, and an error does not occur in the reception of original data. The separation of the downstream PON frame transferred from the 10 G AGC 15020 is performed in the downstream PON frame separation section 15040.

The downstream PON frame separation section 15040 is for separating the overhead and the payload multiplexed in the received downstream PON frame. Although the detailed operation will be omitted, when the head of the downstream signal 130 is found through the frame synchronization pattern 5001, based on the PON control message contained in the PLOAM field 5011, the downstream PON frame separation section performs setting necessary for the operation of the ONU, and generates a control message including a monitor result of the ONU itself and control content requested to the OLT 200, inserts it in the PLOAM field 6020 of the upstream signal 150, and transmits it to the OLT 200. Incidentally, after the downstream BW map end section 15050 confirms the downstream BW map in the overhead demultiplexed by the downstream PON frame separation section 15040, the downstream BW map end section 15050 notifies the information to the 1 G/10 G signal timing control section 15060. The 1 G/10 G signal timing control section 15060 notifies the downstream PON frame separation section 15040 of the timing information with respect to the overhead of the frame at the time of next arrival. Thus, the downstream PON frame separation section 15040 reads the overhead of the 10 G signal and can perform processing while discriminating between the 1 G signal and the 10 G signal. Besides, the grant termination section 15070 extracts the grant designation to the ONU itself from the grant designation contained in the grant designation field 5021, and extracts the information of the packet buffer section 15110 according to the transmission timing of the upstream signal of the ONU itself. The upstream signal 150 is generated based on the extracted information, and is transmitted to the OLT 200.

Further, the downstream PON frame separation section 15040 confirms the content of the 10 G GEM header 5051 multiplexed in the 10 G frame payload 5041. Here, when the 10 G GEM header 5051 is for the ONU itself, the data of the 10 G payload 5061 subsequent to the GEM header is transmitted to the frame distribution section 15080, and the other GEM header and data of the payload are discarded. At this time, the earlier captured downstream BW map in the overhead includes the state of information of transmission speed which can be handled by itself in the frame payload of the downstream PON frame, and the state of the signal to the ONU itself. The downstream PON frame separation section 15040 acquires the timing information from the 1 G/10 G signal timing control section 15060, and can discriminate the field which can be neglected because of the 1 G signal (since the O/E 15010, the 10 G AGC 15020, and the downstream PON frame separation section 15040 are for the 10 G signal, they can not accurately operate for the 1 G signal, and originally treat the 1 G signal as an error signal), and the 10 G signal component. Besides, the GEM header 5051 for the ONU itself and the 10 G payload 5061 can be discriminated, and the objective data for the ONU itself can be acquired.

The frame distribution section 15080 once stores the received data in the packet buffer section 15090 for each of the destination terminals 400/410, and then transmits it to the terminal 400/410 through the user IF 15100 as the interface to the terminal.

Next, transmission of an upstream signal will be described. Hereinafter, the reference numerals in FIG. 15 and FIG. 16 are also indicated.

The data transmitted by each of the terminals 400/410 is once stored in the packet buffer 15110/16110 through the user IF 15100/16100. Based on the timing information of the grant designation field 5020/5021 received by the grant termination section 15070/16070, the upstream signal 150 is assembled by the upstream PON frame generation section 15160/16160 as described below. The upstream signal 150 is converted from the electrical signal to the optical signal by the E/O 15170/16170, and is transmitted to the OLT 200 via the branch optical fiber 120 through the WDM filter 15000/16000.

(1) The data of the bandwidth (the amount of data allowed to be transmitted) determined by the grant designation and by the OLT 200 is read from the packet buffer section 15110/16110, and the 5 G payload (FIG. 6: 6310) or the 1 G payload (FIG. 6: 6311) is generated.

(2) The GEM header (FIG. 6: 6300/6301) generated by the GEM header generation section 15130/16130 is attached to the front of the 5 G payload 6310 or the 1 G payload 6311, and the frame payload (FIG. 6: 6040/6041) is generated. The GEM header 6300/6301 has the structure shown in FIG. 6(C), and since the details of the respective bytes are specified in Recommendation G.984, their description will be omitted.

(3) The transmission control section 15120/16120 inserts the control message including the monitor result of the ONU 300/310 itself and the control content requested to the OLT 200 into the PLOAM field 6020/6021 of the upstream signal

150. Besides, the queue length monitor section 15150/16150 monitors the amount of data stored in the packet buffer section 15110/16110 and waiting for transmission to the OLT 200, and inserts the data amount as the queue length report to the queue length field 6030/6031 specified between the PLOAM field 6020/6021 and the frame payload 6040/6041.

(4) In the burst data 6120/6121, the control signal 6110/6111 including the PLOAM field 6020/6021 and the queue length field 6030/6031 is added to the front of the frame payload 6040/6041, and the burst overhead 6100/6101 including the preamble field 6000/6001 generated by the overhead generation section 15140/16140 and the delimiter field 6010/6011 is further added to the front of the burst data, and the upstream signal 150 is assembled. The upstream signal 150 is added with the guard time 6200 based on the grant designation specified from the OLT 200 and is transmitted at the specified timing.

(Operation at the Time of Start-Up)

Figure 2A:
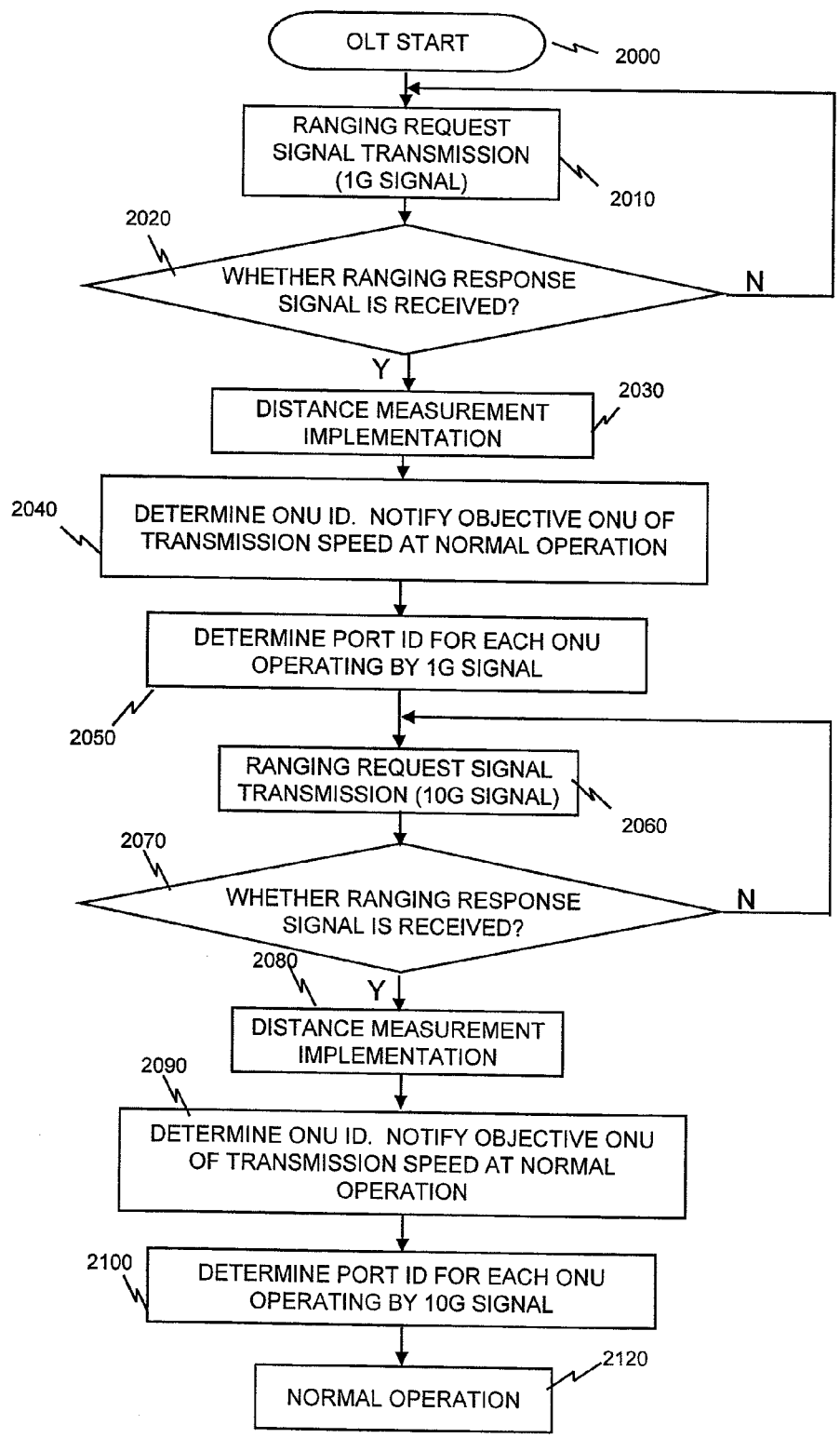
FIG. 2A is a flowchart 1 showing a flow of an OLT operation at the time of ranging.
Figure 2B:
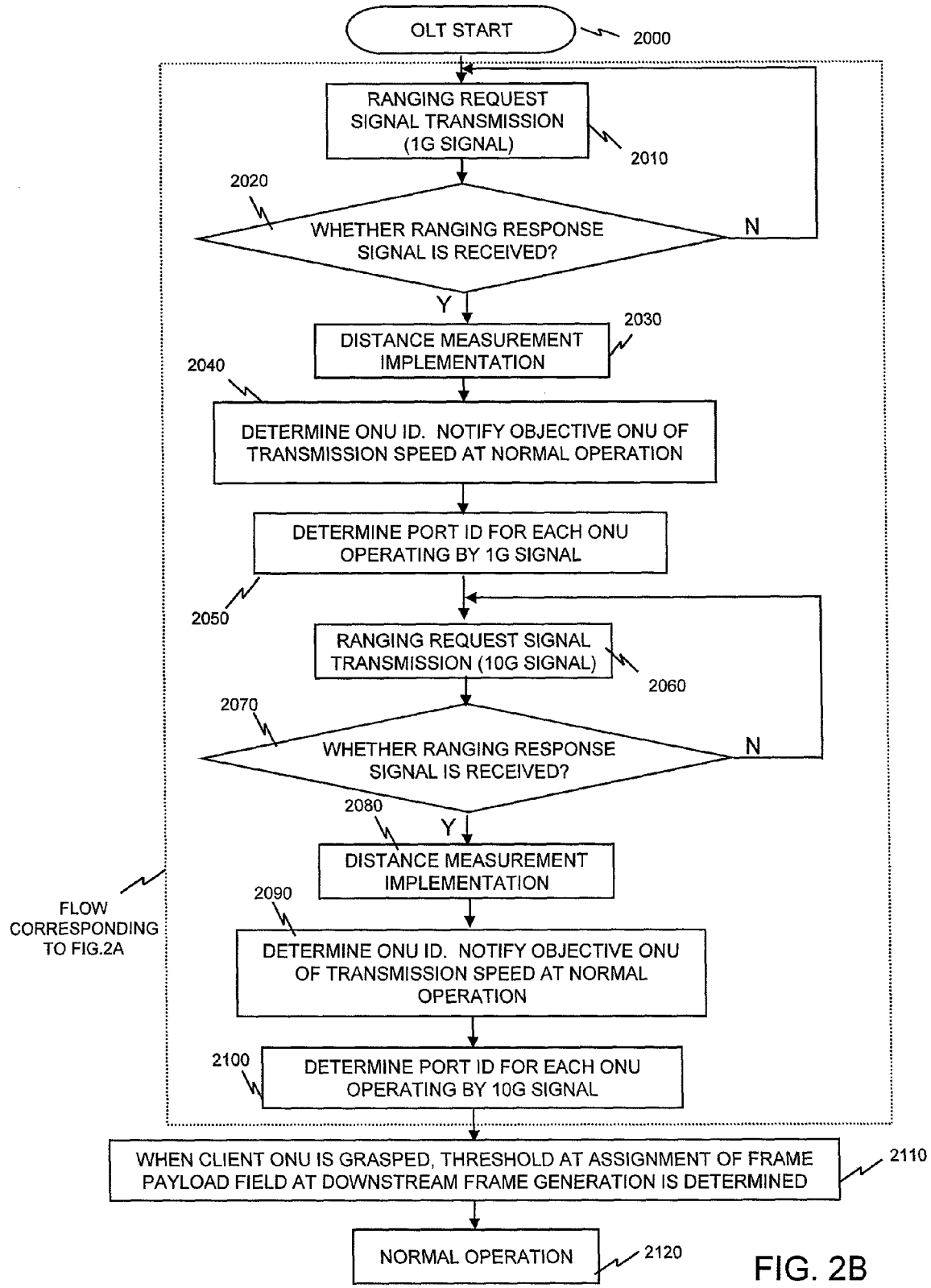
FIG. 2B is a flowchart 2 showing the flow of the OLT operation at the time of ranging.
Figure 3A:
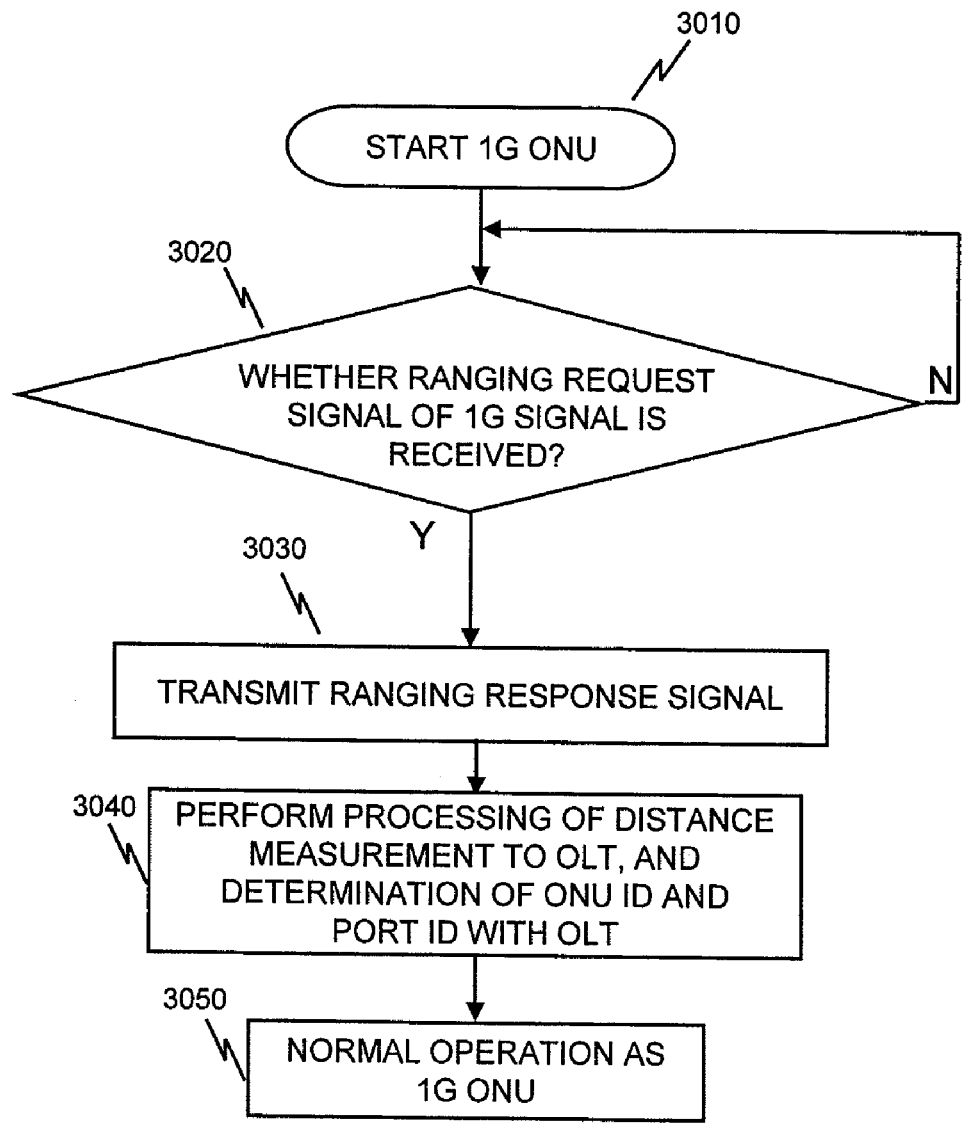
FIG. 3A is a flowchart 1 showing a flow of an ONU operation at the time of ranging.
Figure 3B:
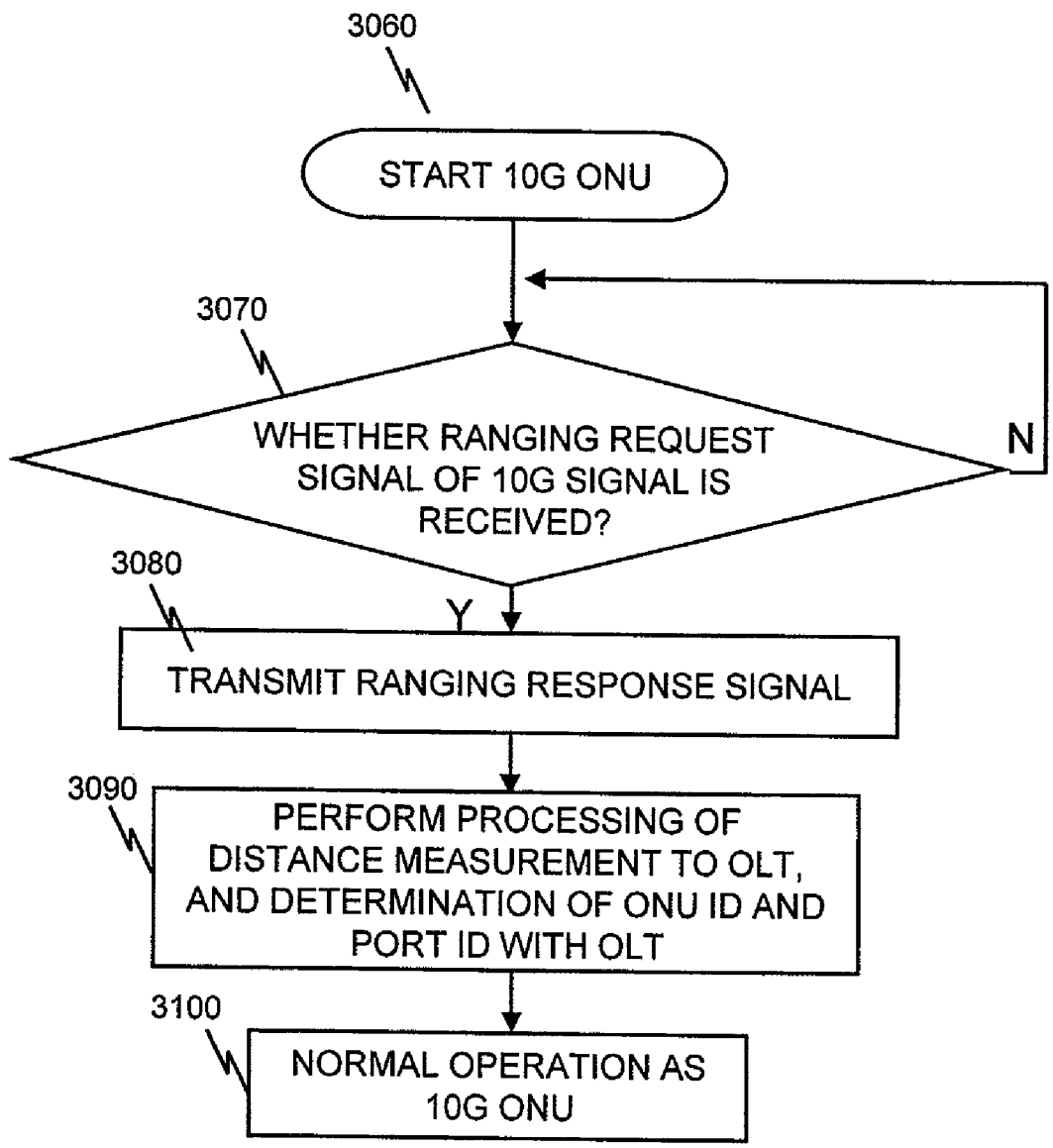
FIG. 3B is a flowchart 2 showing the flow of the ONU operation at the time of ranging.

FIG. 2A and FIG. 2B are flowcharts showing the operation of the OLT at the time of start-up. FIG. 3A is a flowchart showing the operation at the time of start-up of the ONU 310. FIG. 3B is a flowchart showing the operation at the start-up of the 10 G ONU 300. The difference between the flows of FIG. 2A and FIG. 2B is the presence or absence of the step (FIG. 202: 2110) relating to threshold determination described later.

At the time of start-up, the OLT 200 and the ONU 300/310 perform distance correction called ranging. First, at the OLT 200 side, a ranging request generation section 7230 transmits a ranging request signal to the ONU 300/310. Incidentally, which one of the 1 G and 10 G ranging processes may be performed first. At this time, since the ONUs 300/310 different in transmission speed are arranged under the OLT 200, first, the OLT 200 transmits the ranging request signal (2010 in FIG. 2A and FIG. 2B) of the 1 G signal to the 1 G ONU 310 having the low transmission speed. When receiving the ranging request signal of the 1 G signal, since the 10 G ONU 300 recognizes it to be error, a ranging response signal is not sent back. At this time, although the details will be described later, in the OLT 200, since the overhead generation section 7170 and the downstream PON frame assembling section 7020 assemble the signal by the 10 G signal, while the ranging of the 1 G signal is performed, the ranging request generation section 7230 instructs the downstream 1 G/10 G signal switching section 7030 to perform speed conversion to the 1 G signal.

In the 1 G ONU 310 (FIG. 3A: 3020) receiving the ranging request signal of the 1 G signal, a ranging request termination section 16180 receives the ranging request signal, and a ranging response generation section 16190 generates a ranging response signal and sends back the ranging response signal (FIG. 3A: 3030). When receiving the 1 G signal, since the 10 G ONU 300 recognizes it to be an error signal, a ranging response signal is not sent back. The OLT 200 receives the ranging response signal by the ranging signal termination section 7210, and performs the distance measurement and decides the ONU ID based on the received ranging response signal. When the OLT 200 receives the ranging response signal, since the transmission speed of the reception is that of the 1 G signal, the ranging request generation section 7230 instructs the 1 G/10 G switching control section 7205 to perform the reception by the 1 G signal. Besides, an ONU ID generation section 7240 in the OLT 200 notifies the assigned ONU ID to an ONU transmission speed information storage section 8010 or an ONU transmission speed information storage and threshold determination section 8030. Besides, the ranging request generation section 7230 also notifies the transmission speed of the present ranging request signal to the ONU transmission speed information storage section 8010 in the downstream BW map generation section 7160 or the ONU transmission speed information storage and threshold determination section 8030. The ONU transmission speed information storage section 8010 or the ONU transmission speed information storage and threshold determination section 8030 correlates the ONU ID with the transmission speed as in FIG. 4A based on the information and stores them. Thereafter, the 1 G ONU 310 receives the result of the distance measurement and the ONU ID, sets the PORT ID, and shifts to the normal operation (2020 to 2050 in FIG. 2A and FIG. 2B, 3040 and 3050 in FIG. 3A). Incidentally, since the detailed contents of the method of the distance measurement, and the assignment of the ONU ID and the PORT ID are described in G.984, their description will be omitted.

Next, the OLT 200 transmits a ranging request signal of the 10 G signal to the respective client ONUs 300/310 (2060 in FIG. 2A and FIG. 2B). At this time, when receiving the ranging request signal of the 10 G signal, the 1 G ONU 310 recognizes it to be an error, and therefore, a ranging response signal is not sent back. The 10 G ONU 300 receives the ranging request signal, and transmits a ranging response signal to the OLT 200 similarly to the 1 G ONU 310, and while performing the distance measurement with respect to the OLT 200 and the setting of the ONU ID and PORT ID, the 10 G ONU shifts to the normal operation (this flow is denoted by 2070 to 2100 in FIG. 2A and FIG. 2B, 3070 to 3100 in FIG. 3B). At this time, since the OLT 200 performs transmission and reception by the 10 G signal, while the ranging request generation section 7230 performs the ranging by the 10 G signal, the OLT instructs the downstream 1 G/10 G signal switching section 7030 and the upstream 1 G/10 G switching control section 7205 to operate at 10 G. Besides, similarly to the 1 G ONU 310, the OLT 200 performs the distance measurement with respect to the 10 G ONU 300 and the setting of the ONU ID and the PORT ID, and the ONU transmission speed information storage section 8010 or the ONU transmission speed information storage and threshold determination section 8030 correlates the ONU ID with the transmission speed as in FIG. 4B and stores them. Thereafter, by the combination of the previously stored information of FIG. 4A, the ONU transmission speed information storage section 8010 or the ONU transmission speed information storage and threshold determination section 8030 finally completes the correspondence table of all the client ONU IDs and the transmission speeds. The OLT 200 performs the start-up process for all the client ONUs 300/310 while performing the distance measurement and the setting of the ONU ID and the PORT ID, and grasping the state of the transmission speed of all the ONUs 300/310, and shifts to the normal operation (2120 in FIG. 2A and FIG. 2B). At this time, the ONU transmission speed information storage section 8010 or the ONU transmission speed information storage and threshold determination section 8030 notifies the correspondence table of the ONU ID and the transmission speed of FIG. 4C to the downstream BW map table generation section (8020-1 of FIG. 8A, 8020-2 of FIG. 8B). The notified correspondence table of the ONU ID and the transmission speed is used for the downstream BW map generation described later in FIG. 8, FIG. 9 and FIG. 11 at the time of the normal operation.

Besides, the correspondence table of the ONU ID and the transmission speed of FIG. 4C is also used for the threshold determination for each transmission speed when the structure of the downstream signal 130 is formed in which the number of dummy signals is decreased as much as possible. Specifically, when the correspondence table of FIG. 4C is completed, the ONU transmission speed information storage and threshold determination section 8030 in the OLT 200 determines the threshold and ratio of the bandwidth (or the length of transmission timing) secured for each transmission speed of the frame payload at the time of generation of the downstream signal 130 (FIG. 2B: 2110). When FIG. 4C is used as an example, there are 16 1 G ONUs 310 and 48 10 G ONUs 300. At this time, in the example, it is understood that the more 10 G ONUs 300 are contained. Thus, at the time of generation of the downstream signal 130 at the normal operation, like the ratio of the client ONUs, the threshold can be determined such that 75% of the whole frame payload is assigned to the 10 G signal, and the remaining 25% is assigned to the 1 G signal. Incidentally, the threshold of the value of the bandwidth, the length of transmission timing or the like corresponding to 75% or 25% of the whole frame payload may be obtained. The foregoing assignment is an example, and the embodiment is not limited to this assignment, but may suitably perform the assignment. Besides, when the threshold according to which the 10 G signal and the 1 G signal are assigned is determined, the threshold of the assignment may be changed according to the frame of the transmission speed to which priority is to be given, or a contract with a customer. When determining the threshold according to which the 10 G signal and the 1 G signal are assigned, the ONU transmission speed information storage and threshold determination section 8030 notifies the threshold to the downstream BW map table generation section (FIG. 8B: 8020-2). The notified information is used for the downstream BW map generation described later in FIG. 8B, FIG. 9B or FIG. 11 at the time of the normal operation. Incidentally, step 2110 may be omitted.

(Generation Method 1 of the Downstream BW Map)

Figure 8A:
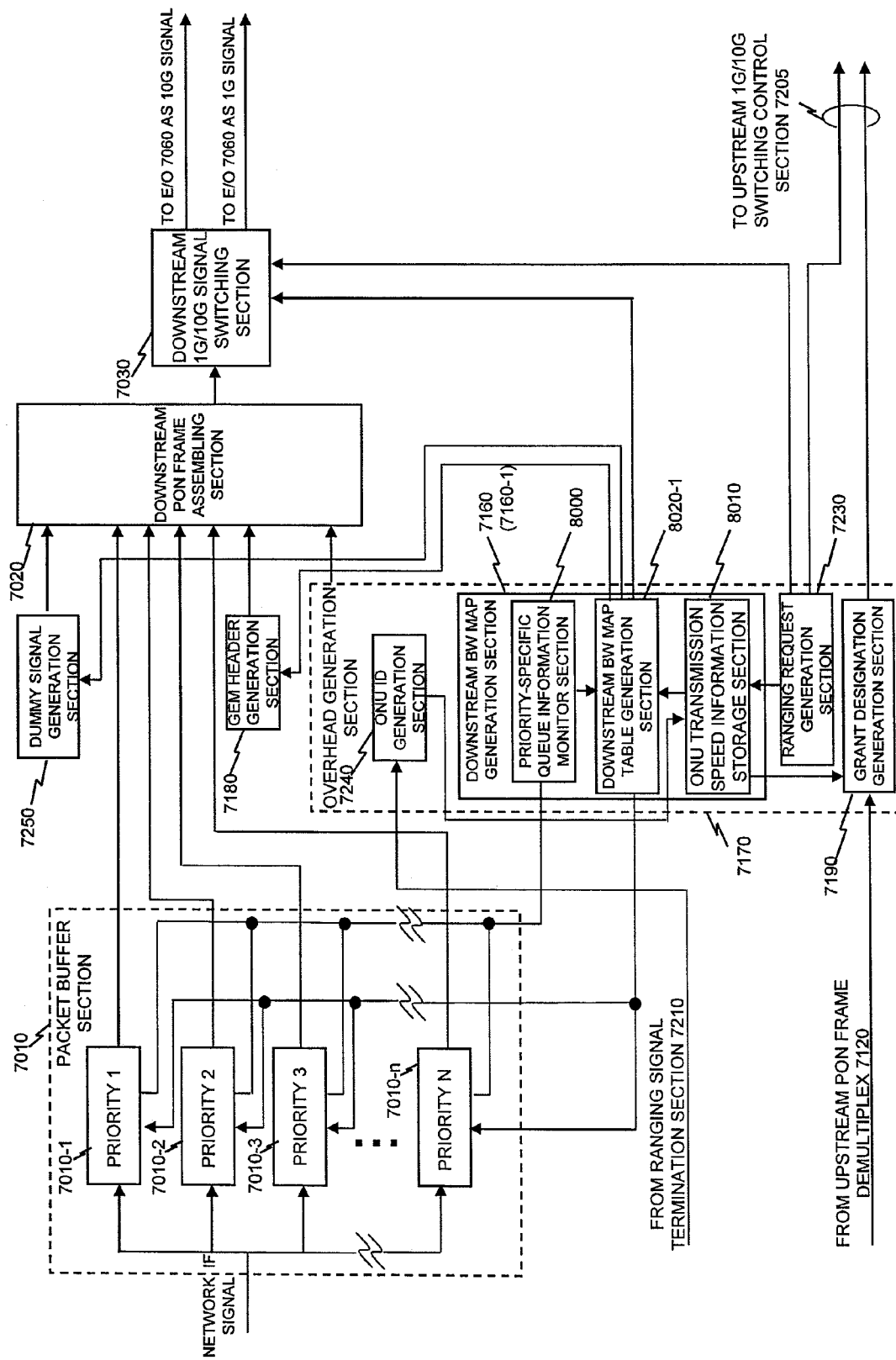
FIG. 8A is a structural view 1 showing a downstream BW map generation section.
Figure 8B:
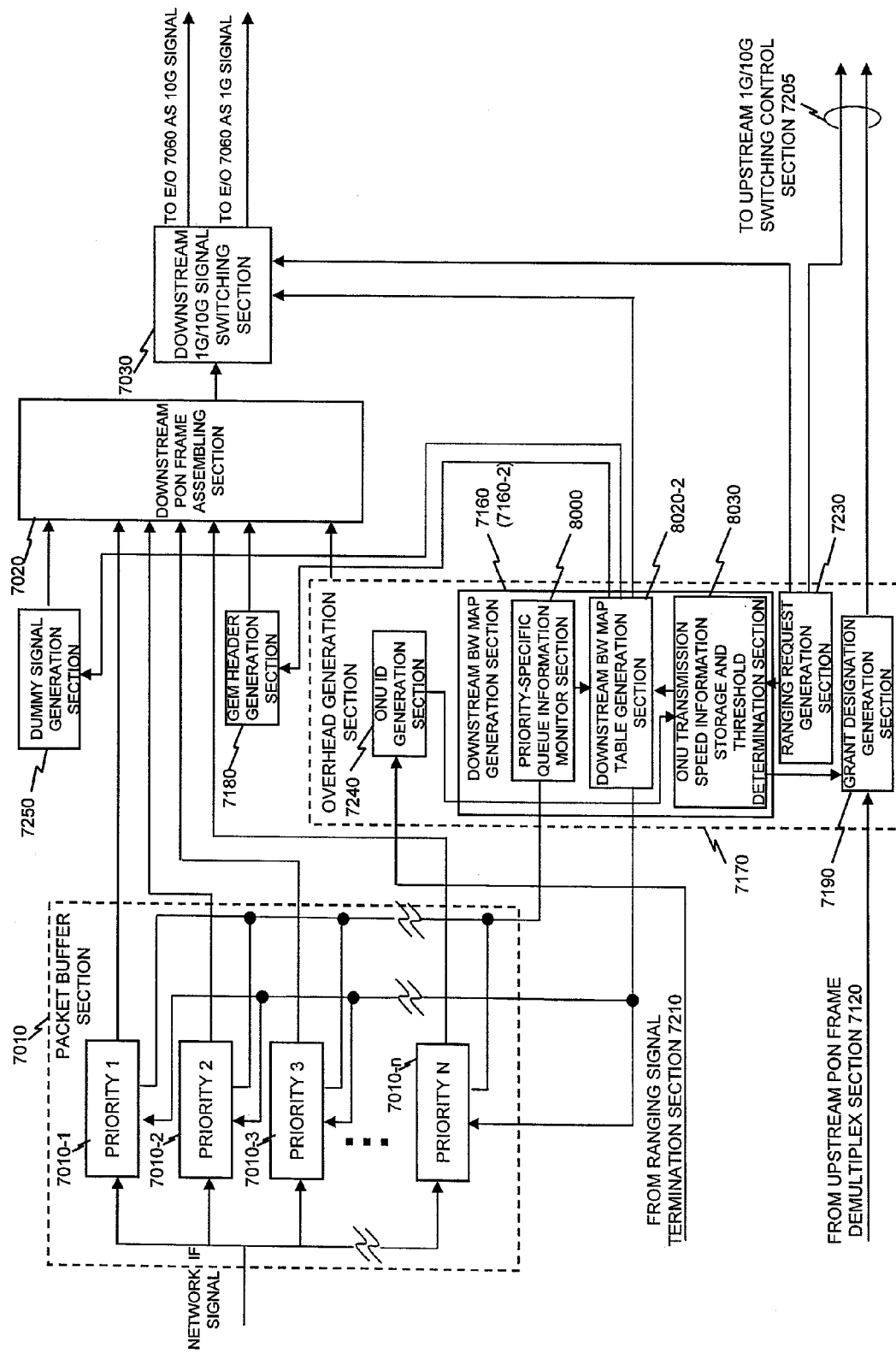
FIG. 8B is a structural view 2 showing a downstream BW map generation section.
Figure 9A:
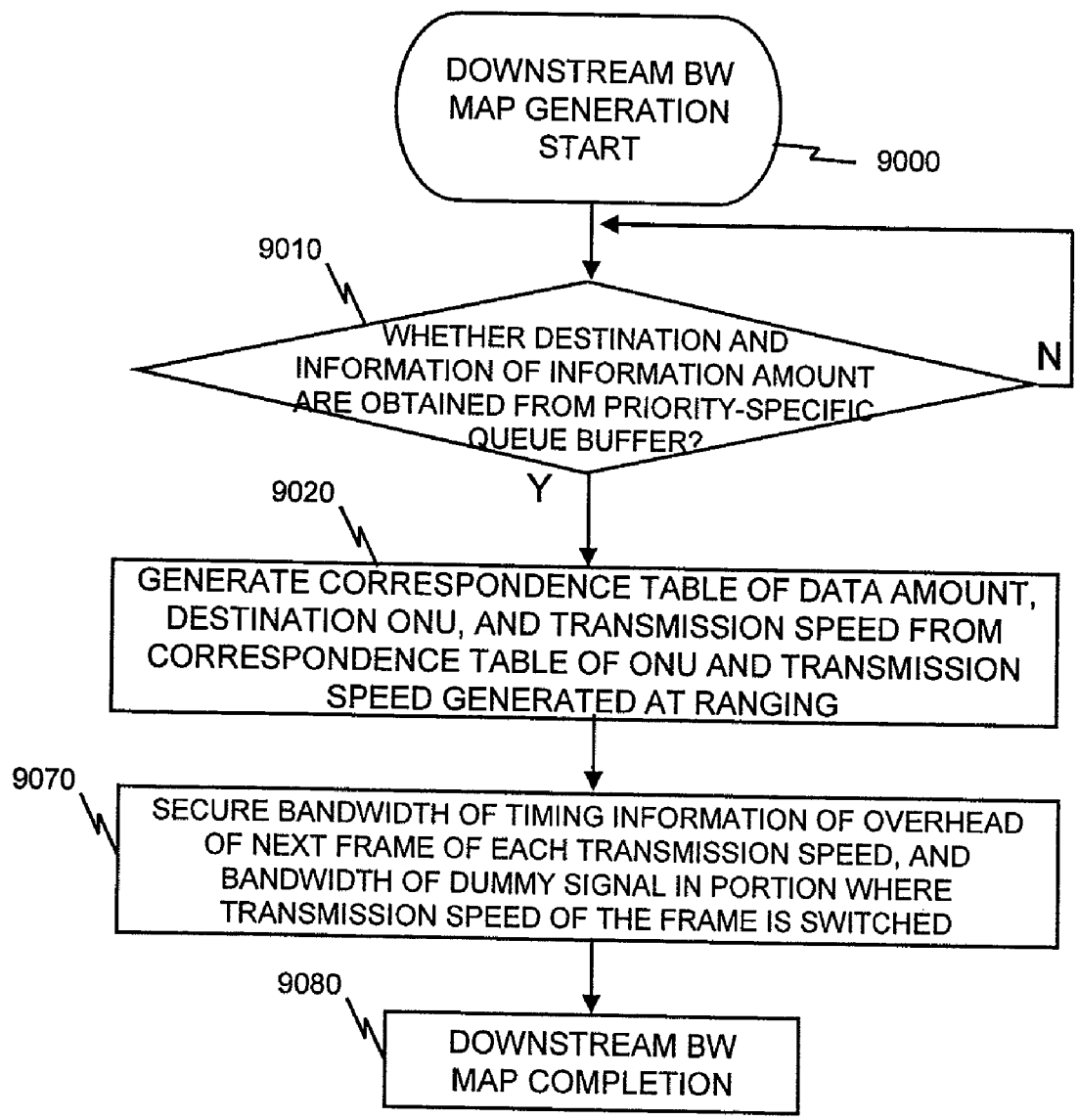
FIG. 9A is a flowchart 1 showing a flow of downstream BW map generation.

FIG. 8A is a block diagram 1 showing a structural example of the downstream BW map generation section 7160 included in the OLT 200. FIG. 9A is a flowchart 1 of downstream BW map generation.

First, a description will be given to a structure of the downstream BW map generation section 7160 (7160-1 here) shown in FIG. 8A, and a generation process of a downstream BW map generated in accordance with the flow of the downstream BW map generation shown in FIG. 9A. The downstream signal 130 shown in FIG. 5A is generated based on the downstream BW map generated here. The downstream BW map generation section 7160-1 of FIG. 8A includes a priority-specific queue information monitor section 8000 to obtain priority-specific queue buffer information from respective priority-specific queue buffers 7010-1 to 7010-n of the packet buffer section 7010, the ONU transmission speed information storage section 8010 to store transmission speed information of each ONU from the result at the time of ranging, and the downstream BW map table generation section 8020 to generate the downstream BW map in accordance with the flow of FIG. 9A.

The priority-specific queue information monitor section 8000 captures queue information from the priority-specific queue buffers 7010-1 to 7010-n. The queue information includes information such as destinations to the respective ONUs in the transmission of the downstream signal 130 and the transmission amount. The ONU transmission speed information storage section 8010 previously notifies the downstream BW map table generation section 8020-1 of the applied transmission speeds (FIG. 4C) of the respective ONUs. The downstream BW map table generation section 8020-1 obtaining the applied transmission speeds of the respective ONUs checks the data amount, priority, and destination of the respective information, and generates the downstream BW map.

For example, it is assumed that the priorities of from priority 1 to priority 4 are set for the priority-specific queue buffers, and information of the ONU number 33 is stored in the priority 1, information of the ONU number 1 is stored in the priority 2, information of the ONU number 34 is stored in the priority 3, and information of ONU number 35 is stored in the priority 4. The priority-specific queue information monitor section 8000 captures the stored respective destinations and the information amount, and notifies them to the downstream BW map table generation section 8020-1 (FIG. 9A: 9010). The downstream BW map table generation section 8020-1 refers to the transmission speed information (FIG. 4C) of the respective ONUs previously generated by the ONU transmission speed information storage section 8010, and generates the correspondence table of the priority of information to be transmitted, the ONU number (or ID) of the destination, the transmission speed (Signal in the drawing) to each destination, and the secured bandwidth (data amount) (FIG. 9A: 9020, FIG. 11A). After generating the correspondence table of FIG. 11A, the downstream BW map table generation section 8020-1 adds information of the dummy signal 5110/5111 to be inserted to a place where the transmission speed of the signal is changed (for example, a place where the 10 G signal is changed to the 1 G signal, or a place where the 1 G signal is changed to the 10 G signal), and timing information of an overhead section of a frame to be transmitted next to the frame generated at this time (FIG. 9A: 9070, FIG. 11B). Besides, the transmission timing information (Start, End) is assigned according to the bandwidth. The list of FIG. 11B becomes the downstream BW map. In the example of FIG. 11B, for example, the payload is arranged in the order of priority.

With respect to the dummy signal 5110/5111, when the inside of the downstream signal 130 is switched from the 1 G signal to the 10 G signal, since the respective ONUs 300/310 must follow the 10 G signal, the dummy signal 5110 of the 10 G signal is used. Besides, when the inside of the downstream signal 130 is switched from the 10 G signal to the 1 G signal, since the respective ONUs 300/310 must follow the 1 G signal, the dummy signal 5111 of the 1 G signal is used. By the effect of the dummy signal 5110/5111, when a variation in received signal level due to a change in transmission speed (variation in optical level) occurs in the whole frame, the respective ONUs 300/310 can obtain a time required to follow the variation. That is, while the dummy signal is being received, the ONU 300/310 may cause a reception error. However, since data irrelevant to the original data is received in the period, even if the error occurs, there is no problem. When the reception of the dummy signal is ended, since the ONUs 300/310 completes following the received signal level, the ONU 300/310 has only to receive the original data after following the received signal level is completed. Incidentally, the length of the dummy signal can be suitably determined, for example, it is previously determined according to the performance of each ONU. Besides, each of the ONUs 300/310 refers to the downstream BW map stored in the received downstream signal 130, and discriminates the signal of the transmission speed which can be handled by itself in the frame payload of the frame or the frame payload to itself, and can receive the signal of its own transmission speed without error. In addition, the ONU 300/310 obtains the timing information of the overhead section of a frame which arrives next to the frame, and can receive the overhead section at the time of reception of the next frame. Further, by referring to the downstream BW map stored in the overhead section, the ONU can grasp the state of the frame payload of the frame, and can receive the whole frame without error.

(Generation Method 2 of the Downstream BW Map)

Figure 9B:
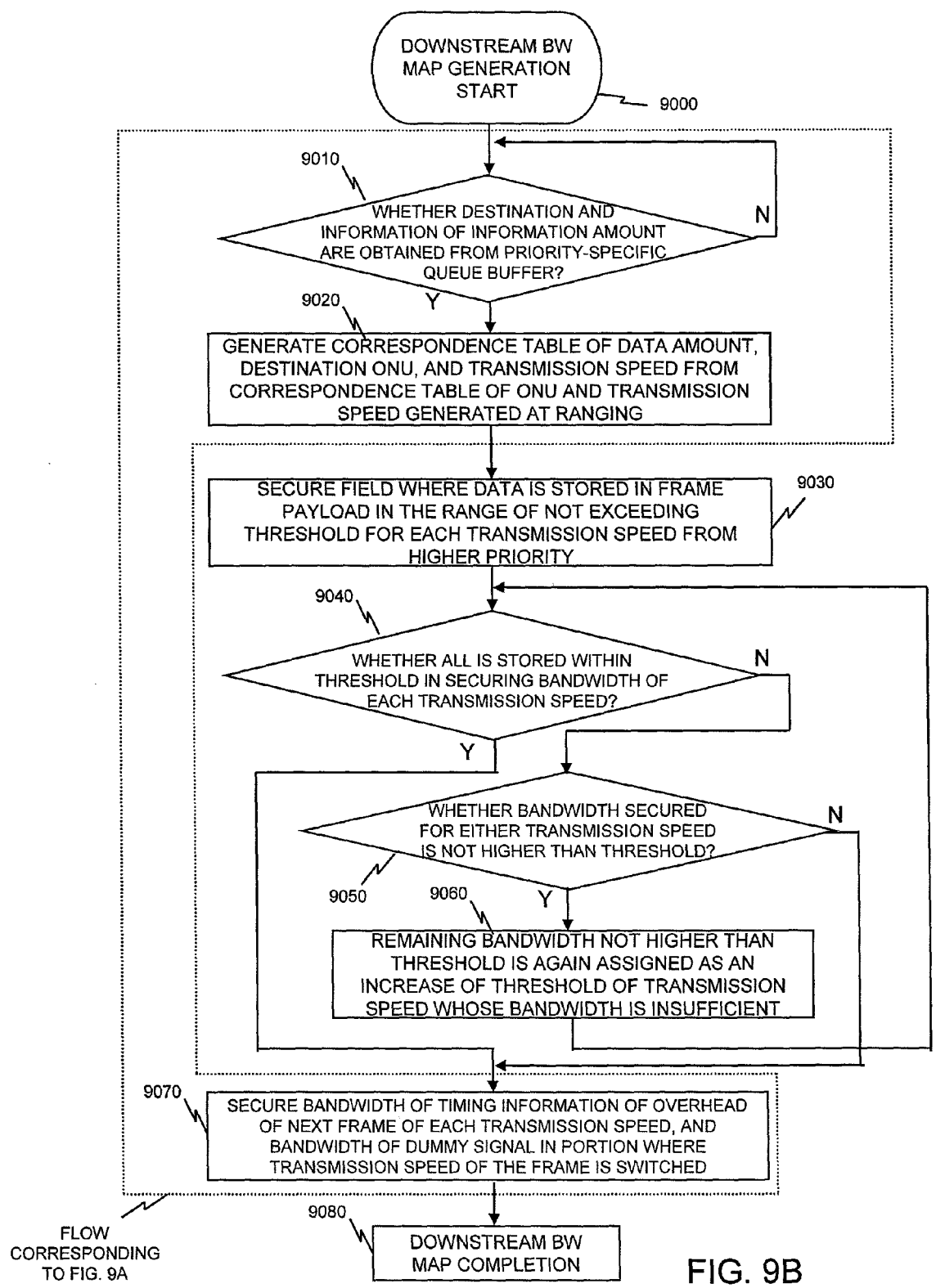
FIG. 9B is a flowchart 2 showing the flow of the downstream BW map generation.

FIG. 8B is a block diagram 2 showing a structural example of the downstream BW map generation section 7160 included in the OLT 200. FIG. 9B is a flowchart 2 of downstream BW map generation. When the structure shown in FIG. 8B is used for the downstream BW map generation section 7160, and the flow of the downstream BW map generation of FIG. 9B is applied, the downstream BW map as the origin of the generation of the downstream signal 130 shown in FIG. 5B is generated. As compared with the case of FIG. 8A, the structure of the downstream BW map generation section 7160 (7160-2 here) is provided with an ONU transmission speed information storage and threshold determination section 8030 instead of the ONU transmission speed information storage section 8010. Besides, the downstream BW map table generation section 8020-2 generates the downstream BW map in accordance with the flow of the downstream BW map generation of FIG. 9B. As compared with the flow of the downstream BW map generation of FIG. 9A, the flow of the downstream BW map generation of FIG. 9B is such that a flow of assigning a frame payload based on the threshold determined by the OLT 200 is added.

Here, payloads of the same transmission speed are integrated, the number of inserted dummy signals is suppressed, and the resource consumption by the dummy signals is suppressed.

Similarly to the description of FIG. 8A, the priority-specific queue information monitor section 8000 captures queue information from the respective priority-specific queue buffers 7010-1 to 7010-n. The queue information includes information such as the destinations to the respective ONUs in the transmission of the downstream signal 130 and the transmission amount. The ONU transmission speed information storage and threshold determination section 8030 previously notifies the downstream BW map table generation section 8020-2 of the applied transmission speed (FIG. 4C) of the respective ONUs and the threshold at the time of frame generation for each transmission speed. The downstream BW map table generation section 8020-2 obtaining the applied transmission speed of the respective ONUs 300/310 checks the threshold of the information for each transmission speed determined before the normal operation in addition to the data amount of the respective information, priorities and destinations, and generates the downstream BW map.

For example, it is assumed that priorities of from priority 1 to priority 4 are set for the priority-specific queue buffers, and information of the ONU number 33 is stored in the priority 1, information of the ONU number 1 is stored in the priority 2, information of the ONU number 34 is stored in the priority 3, and information of ONU number 35 is stored in the priority 4. The priority-specific queue information monitor section 8000 captures the stored respective destinations and the information amount, and notifies them to the downstream BW map table generation section 8020-2 (FIG. 9B: 9010). The downstream BW map table generation section 8020-2 refers to the transmission speed information (FIG. 4C) of the respective ONUs previously generated by the ONU transmission speed information storage and threshold determination section 8030, and generates the correspondence table of the priority of information to be transmitted, destination, transmission speed to each destination, and the secured bandwidth (data amount) (FIG. 9B: 9020, FIG. 11A). Thereafter, reference is made to the threshold (for example, 75% of the bandwidth usable for the payload for the 10 G signal, 25% of the bandwidth usable for the payload for the 1 G signal) of the information amount for each transmission speed, and the field of the frame payload is secured. Specifically, when the frame payload of the 10 G signal is constructed, the frame information of the priority 1, the priority 3 and the priority 4 are extracted and the bandwidth is secured. When the total of the summed bandwidths does not exceed 75% of the whole frame payload determined as the threshold as described before, it is secured as the frame payload of the 10 G signal. When the total exceeds the threshold of 75% of the whole, the frame is sequentially removed from the frame of the lowest priority 4, and when the total level becomes a level not exceeding the threshold, the field of the secured frame is set to be the frame payload of the 10 G signal. A similar operation is performed also on the 1 G signal. Here, when the frame payload of one of the transmission speeds exceeds the threshold, and the frame payload of the other of the transmission speeds is secured to be the threshold or less, the threshold of the frame payload of the transmission speed exceeding the threshold is increased, the frame, which could not be inserted, is inserted into the increased bandwidth, and the efficient frame payload structure is formed (this flow is FIG. 9B: 9030 to 9060). As stated above, the frame payload is intensively structured for each transmission speed, so that the number of dummy signals originally irrelevant to the downstream signal 130 can be suppressed to the minimum.

Similarly to the time of the description of FIG. 8A and FIG. 9A, the downstream BW map table generation section 8020-2 determining the structure of the frame payload in this way adds information of the dummy signal 5110/5111 provided at the place where the transmission speed is changed, and the timing information of the overhead section inserted into the frame at the time of next frame transmission, and generates the downstream BW map as in FIG. 11C (FIG. 9B: 9070, 9080). Since the effects of the addition of the dummy signal and the addition of the timing information of the overhead section of the next transmitted frame are as described before, their description here will be omitted.

Incidentally, the assignment bandwidth shown in the drawings is an example, and the embodiment is not limited to this bandwidth.

The downstream BW map table generation section 8020 not only inserts the generated downstream BW map into the overhead section of the downstream PON frame, but also notifies it to the downstream 1 G/10 G signal switching section 7030. The notified downstream 1 G/10 G signal switching section 7030 distributes the downstream PON frame sent from the downstream PON frame assembling section 7020 to 10 G/1 G.

Incidentally, in the former example, although data distribution from the upper network 20 is divided into four stages, that is, the priority 1 to the priority 4 according to the priority, this is an example of the distribution, and the division number is not necessarily limited but may be arbitrary. Besides, since the generation of the overhead section and the GEM header except the grant designation and the downstream BW map is specified in Recommendation G.984, their description will be omitted here.

(Generation of Downstream Signal)

The downstream PON frame assembling section 7020 of the OLT 200 uses the packet buffer section 7010 operating based on the downstream BW map generated by the downstream BW map generation section 7160, the GEM header generation section 7180, the overhead generation section 7170, and the dummy signal generation section 7250, and assembles the downstream signal 130 in the manner as described below.

(1) The signal from the overhead generation section 7170 is received, and the overhead section including the frame synchronization patterns 5000/5001, the PLOAM fields 5010/5011, the grant designation fields 5020/5021, and the downstream BW maps 5030/5031 is assembled. Incidentally, the frame synchronization patterns, the PLOAM fields, the grant designation fields, and the downstream BW maps, which constitute the overhead section, are respectively prepared by the number of the transmission speeds. Besides, the dummy signal generation section 7250 sets the dummy signal 5110/5111 at the place where the transmission speed is changed. With respect to the dummy signal 5110/5111, when the transmission speed is changed from the 1 G signal to the 10 G signal, the 10 G dummy signal 5110 is set, and when the transmission speed is changed from the 10 G signal to the 1 G signal, the 1 G dummy signal 5111 is set. This is because, in order to enable the ONU 300/310 to follow the variation in received signal level due to the change in the transmission speed (variation in optical level), the dummy signal 5110/5111 of the transmission speed after the switching is required.

(2) The data to the respective ONUs 300/310 are inserted into the frame payload after the overhead section, and the GEM header 5050/5051 to the respective ONUs 300/310 is received from the GEM header generation section 7180 in the order of determination of the downstream BW map generated for the frame and the data is inserted.

(3) Since the downstream BW map determines the length and the order of the data to the respective ONUs 300/310, which is time-division multiplexed in the frame payload 5040/5041, so that the frame length becomes 125 microseconds, the above step (2) is repeated in accordance with this determination. Besides, similarly to the step (1), the dummy signal generation section 7250 sets the dummy signal 5110/5111 at the time of switching of the respective transmission speeds between the frame payloads 5040/5041 in accordance with the downstream BW map.

The downstream PON frame assembled by the downstream PON frame assembling section 7020 is distributed to the 1 G signal and the 10 G signal by the downstream 1 G/10 G signal switching section 7030 based on the timing information of the frame of the generated downstream BW map. At this time, since the plural overhead sections (two overhead sections for the 1 G signal and the 10 G signal in this embodiment) are generated, the downstream 1 G/10 G signal switching section 7030 functions in accordance with the timings of the plural overhead sections, and the structure of the 1 G signal is generated also in the overhead section. In this way, the downstream signal 130 is constructed, is converted by the optical modulation section (E/O: 7060) from the electrical signal to the optical signal, and is broadcasted to the respective ONUs 300/310 through the WDM filter 7070 and via the trunk optical fiber 110, the optical splitter 100, and the branch optical fiber 120. Incidentally, the level of the outputted optical signal may be changed according to the transmission speed.

(Specific Structural Example of Respective Blocks)

Figure 12:
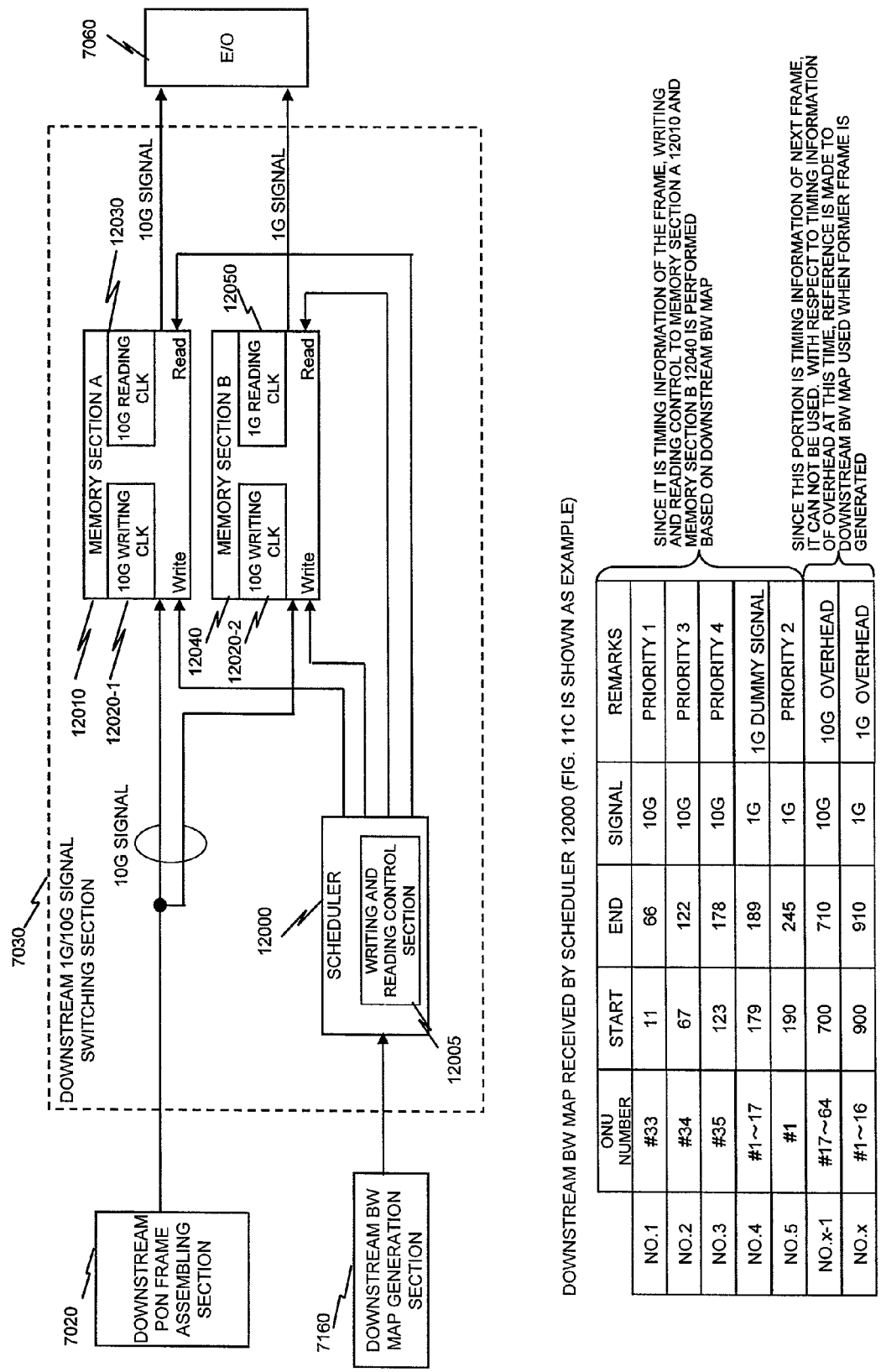
FIG. 12 is a block diagram showing a structural example of a downstream 1 G/10 G signal switching section.

FIG. 12 is a block diagram showing a structural example of the downstream 1 G/10 G signal switching section 7030 included in the OLT.

The downstream 1 G/10 G signal switching section 7030 includes a memory section A12010 incorporating a 10 G writing clock (CLK) 12020-1 and a 10 G reading CLK 12030, a memory section B12040 incorporating a 10 G writing CLK 12020-2 and a 1 G reading CLK 12050, and scheduler 12000 incorporating a writing and reading control section 12005. The downstream PON frame generated by the downstream PON frame assembling section 7020 is transferred to the memory section A12010 and the memory section B12040 in the downstream 1 G/10 G signal switching section 7030. At this time, the OLT 200 generates the downstream BW map and grasps the place in the frame where conversion into the 1 G signal is to be performed. The downstream BW map generation section 7160 transfers the information of the downstream BW map to the scheduler 12000. The scheduler 12000 receives the timing information of the frame from the downstream BW map generation section 7160, and the writing and reading control section 12005 instructs the memory section A12010 and the memory section B12040 to write the arrival frame. At this time, with respect to the timing information of the frame payload, reference is made to the downstream BW map used when this downstream PON frame is generated. With respect to the timing information of the overhead section, reference is made to the downstream BW map used when the downstream PON frame transmitted prior to this downstream PON frame is generated. Specifically, the writing and reading control section 12005 in the scheduler 12000 gives a writing instruction to the memory section A12010 with respect to the 10 G signal portion from the downstream BW map, and with respect to the portion where conversion into the 1 G signal is performed, a writing instruction is given to the memory section B12040. Since the 10 G writing CLK 12020 for writing at the speed of 10 G is set in both the memories, writing is performed without problem. Thereafter, the writing and reading control section 12005 in the scheduler 12000 gives a reading instruction to the respective memory sections in accordance with the downstream BW map. At this time, the memory section A12010 performs reading by the 10 G reading CLK 12030 for reading at the speed of 10 G, and the 10 G signal is transferred as it is. The memory section B12040 performs reading by the 1 G reading CLK 12050 for reading at the speed of 1 G, converts the signal into the 1 G signal and transfers it. The read 10 G signal and the 1 G signal are transferred to the E/O 7060. Incidentally, at the time of ranging before the normal operation, when the ranging is performed by the 1 G signal, the ranging request generation section 7230 instructs the scheduler 12000 to always transfer the transferred frame to the E/O 7060 by using the 1 G signal. When the ranging is performed by the 10 G signal, the ranging request generation section 7230 instructs the scheduler 12000 to always transfer the transferred frame to the E/O 7060 by using the 10 G signal. In the structure of the embodiment, it is an example that the signal transferred from the upper network 20 is formed of the 10 G signal, and the embodiment is not limited to this numerical value. When the transmission speed of a signal transferred from the upper network 20 varies, measures have only to be taken such that the writing CLK in the downstream 1 G/10 G signal switching section 7030 is suitably changed.

Figure 13:
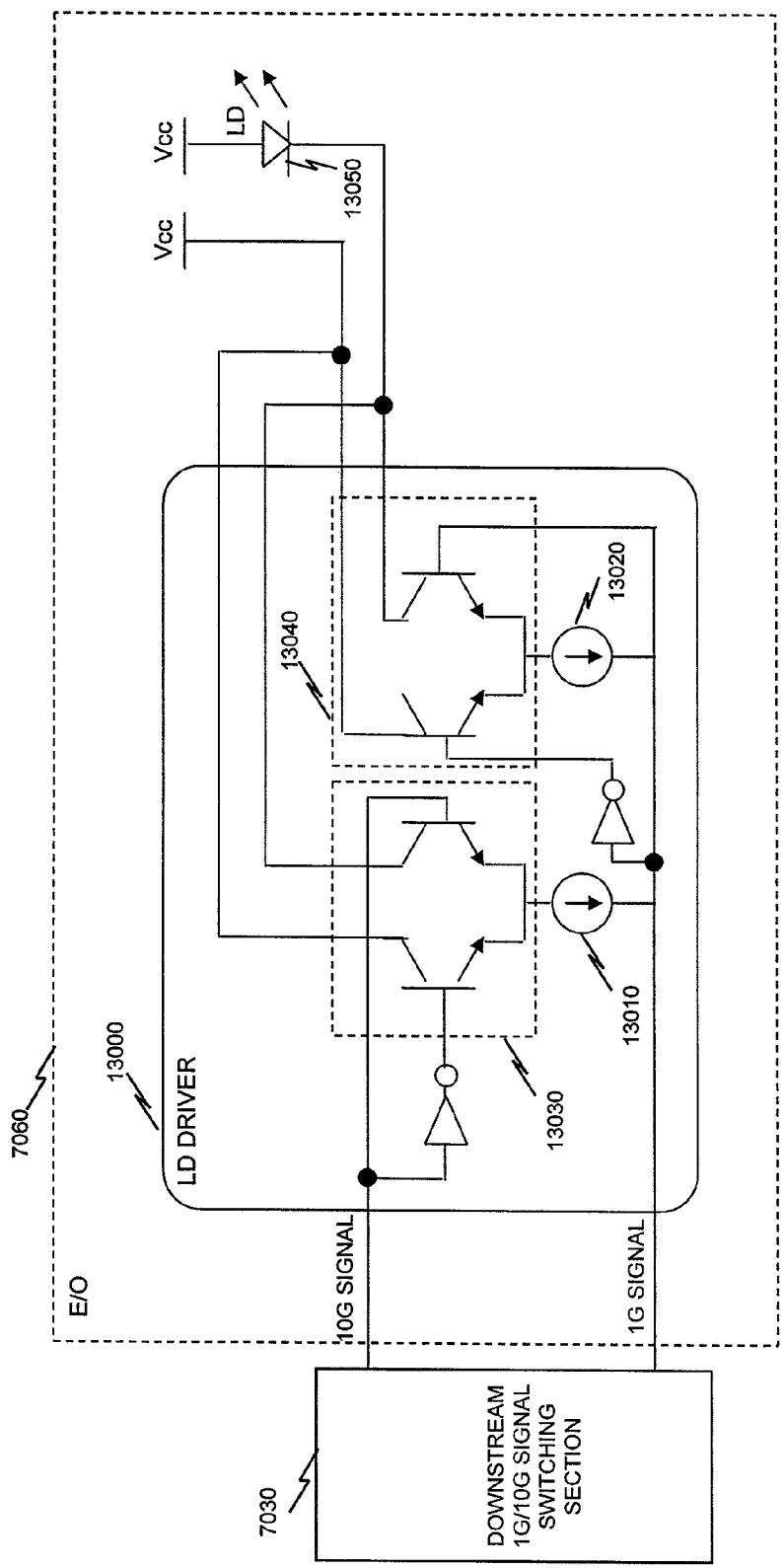
FIG. 13 is a block diagram showing a structural example of an E/O of an OLT.

FIG. 13 is a block diagram showing a structural example of the E/O 7060.

A laser diode (LD) driver 13000 incorporates differential operation transistors 13030/13040 for a line of each transmission speed. At this time, the capacity of a current source is changed, and an LD 13050 can perform light emission having transmission power corresponding to the transmission speed. Although the transmission power of the 10 G signal is not yet specified, when it is different from the present GPON, the transmission power for each transmission speed has only to be realized by the structure as stated above. Specifically, when the signal of each transmission speed is inputted to the differential operation transistor 13030/13040, a current corresponding to the capacity of the connected current source 13010/13020 flows through the LD 13050, and the LD 13050 performs light emission having specific transmission power.

In this way, an electrical signal for each transmission speed is converted into an optical signal, and is transmitted to the ONU 300/310.

Figure 14:
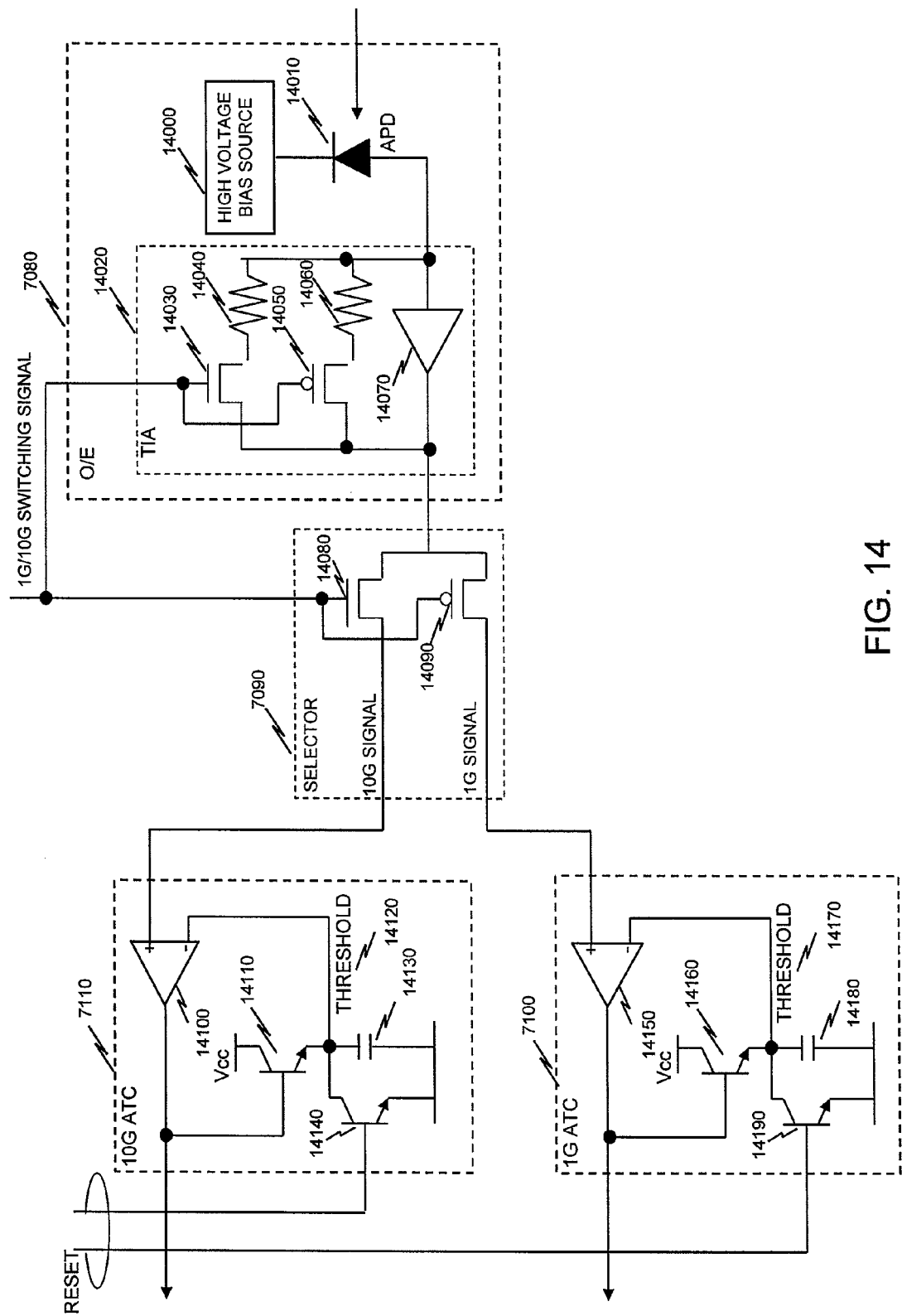
FIG. 14 is a block diagram showing a structural example of an O/E, a selector, a 1 G AGC, and a 10 G AGC of the OLT.

FIG. 14 is a block diagram showing a structural example of the O/E 7080, the selector 7090, the 1 G ATC 7100 and the 10 G ATC 7110.

An avalanche photodiode (APD) connected to a high voltage bias source 14000 is reversely biased at a high voltage, amplifies a received optical signal by an avalanche effect and converts it into an electric current. By this amplification effect, even when a signal is inputted as a weak optical signal, the data can be correctly identified. The converted electric current is converted into a voltage by a trans-impedance amplifier (TIA) 14020 including a resistor and an amplifier, and is transferred to the selector 7090. At this time, the 10 G signal is not yet clearly specified, there is a possibility that its optical level is different from the 1 G signal. The OLT 200 can deal with such a case by switching the resistance value in the TIA 14020 for each transmission speed in accordance with the timing of a grant designation generated by itself. Specifically, in accordance with the grant designation, the upstream 1 G/10 G switching control section 7205 in the OLT 200 sends a switching signal to MOSFET 14030/14050 having a function to switch the resistance in the TIA 14020, and can change the resistance value in the TIA 14020. For example, when the resistance 14060 for the 1 G signal is 1 kΩ, the resistance 14040 for the 10 G signal is set to a resistance value of 100Ω or the like. Next, in the selector 7090, similarly to the TIA 14020, MOSFET 14080/14090 for switching a path is set. The MOSFET 14080/14090 switches a received signal transferred from the O/E 7080 to a suitable path by an instruction from the upstream 1 G/10 G switching control section 7205, and transfers it to the latter stage 1 G ATC 7100 or 10 G ATC 7110. At this time, in an auto threshold adjustment circuit called an auto threshold control (ATC) circuit, threshold 14120/14170 is set to ½ of an amplitude, and a signal identified to have a value of 0 or 1 is outputted. With respect to the output of the amplifier 14100/14150, the peak value detection is performed by using a diode function from the base to the emitter of the transistor 14110/14160, the value is held in capacitor 14130/14180, and is given as the threshold 14120/14170 of the amplifier 14100/14150. A reset signal is given to the transistor 14140/14190 immediately before the signal reception from the respective ONUs 300/310, and the threshold 14120/14170 held in the capacitor 14130/14180 is discharged and is reset to the 0 level. Although the threshold 14120/14170 depends on the value of the capacitor 14130/14180, since the 10 G signal is not yet clearly specified, it is taken into consideration that the threshold is different between the case where the 1 G signal is handled and the case where the 10 G signal is handled, and when the capacitance of the capacitor 14180 of the 1 G ATC 7100 is 100 pF, the capacitance of the capacitor 14130 of the 10 G ATC 7110 is 10 pF, that is, two kinds of capacitors are set.

The resistance values of the resistors 14040/14060 and the values of the capacitors 14130/14180 set forth in the embodiment are examples, and the embodiment is not limited to the numerical values.

According to the structure and the operation of the OLT 200, even when transmission of high speed data of 10 Gbit/sec or the like is newly required for the GPON operating at 1 Gbit/sec, the PON including the OLT and the ONU having the structure in which signals different in the transmission speed are mixedly contained and can be operated, and its communication method can be easily provided.

As described above, according to the structure and the operation of the PON, the OLT and the ONU of the embodiment, it is possible to easily provide the PON having the structure in which existing PON equipments are contained and a shift to a new PON can be made, that is, PONs are mixed and can be operated, and its communication method. Besides, it is possible to easily provide the PON having the structure in which plural PONs different in specifications (regulations) are mixed and can be operated, and its communication method. Incidentally, even if the plural PONs are mixed, the contents of the respective PONs are not erroneously interpreted, and an alarm or an erroneous operation does not occur. Besides, in the PON in which the communication signals from the OLT to the plural ONUs are time-division multiplexed and are transmitted, the plural ONUs different in transmission speed can be mixedly contained, and even if the request for expansion of the communication service capacity occurs, only the corresponding OLT and ONU are exchanged, so that the exchange cost of the communication apparatus can be suppressed.

What is claimed is:

1. A passive optical network system comprising:
a master station to time-division multiplex signals of a first transmission speed and a second transmission speed and to perform communication;
plural slave stations including a first slave station to communicate with the master station at the first transmission speed and a second slave station to communicate with the master station at the second transmission speed; and
an optical fiber network in which the signals from the master station are transmitted to the respective slave stations through a splitter,
wherein each of the plural slave stations includes an automatic gain adjustment circuit to adjust signal level of a received signal from the master station, the signal level varying according to a change of transmission speed of the received signal, and
wherein the master station time-division multiplexes payload and/or overhead information of the first transmission speed, payload and/or overhead information of the second transmission speed, and a dummy signal inserted at a place where the transmission speed is changed, and transmits multiplexed information and signal to the slave stations.

2. The passive optical network system according to claim 1, wherein
the master station uses a dummy signal of the second transmission speed at the place where the multiplexed signal is changed from the first transmission speed to the second transmission speed, and uses a dummy signal of the first transmission speed at the place where the multiplexed signal is changed from the second transmission speed to the first transmission speed.

3. The passive optical network system according to claim 1, wherein
the automatic gain adjustment circuit adjusts the signal level of the received signal, the signal level varying according to a change of transmission speed of the received signal, in a period in which the dummy signal is received.

4. The passive optical network system according to claim 1, wherein
the master station includes:
a transmission speed information storage section in which slave station identification information of the slave stations and transmission speed information of communication of the slave stations are previously stored in correspondence, and a bandwidth information generation section that determines transmission timings of the signals transmitted to the slave stations, refers to the transmission speed information storage section to determine the place where the transmission speed is changed based on the transmission speed information of the signals transmitted at the respective transmission timings to the respective slave stations, and adds a transmission timing for inserting the dummy signal to the place.

5. The passive optical network system according to claim 4, wherein
the master station includes a signal transmission section that transmits a first signal of the first transmission speed to the plural slave stations through the optical fiber network, and transmits a second signal of the second transmission speed to the plural slave stations through the optical fiber network,
when the master station receives a first response signal transmitted from the first slave station receiving the first signal, the master station stores transmission speed information indicating the first transmission speed into the transmission speed information storage section correspondingly to the first slave station identification information, and
when the master station receives a second response signal transmitted from the second slave station receiving the second signal, the master station stores transmission speed information indicating the second transmission speed into the transmission speed information storage section correspondingly to the second slave station identification information.

6. The passive optical network system according to claim 5, wherein
the first and the second signals are ranging request signals in a ranging process for adjusting a difference in signal delay amount due to a difference in transmission distance from the master station to the slave station, and
the first and the second response signals are ranging response signals in the ranging process.

7. The passive optical network system according to claim 4, wherein the master station further includes:
a queue to store data transmitted to the slave stations;
a queue information monitor section to acquire the slave station identification information indicating destinations of the data stored in the queue;
a dummy signal generation section to generate the dummy signal; and
a frame assembling section that assembles, in accordance with the transmission timing in the bandwidth information generation section, a frame in which the data to the respective slave stations stored in the queue and the dummy signal from the dummy signal generation section are time-division multiplexed, and outputs the frame.

8. The passive optical network system according to claim 4, wherein
the bandwidth information generation section determines a first transmission timing to cause the signal of the first transmission speed to be transmitted, determines a second transmission timing to cause the signal of the second transmission speed to be transmitted, the second transmission timing being different from the first transmission timing, and inserts the dummy signal between the signal of the first transmission speed and the signal of the second transmission speed.

9. The passive optical network system according to claim 8, wherein
the bandwidth information generation section is previously set, a ratio of a length of the first transmission timing assigned to a payload of the first transmission speed and a length of the second transmission timing assigned to a payload of the second transmission speed, determines the first transmission timing such that data of the first transmission speed is transmitted within a range according to the ratio, and determines the second transmission timing such that data of the second transmission speed is transmitted within another range according to the ratio.

10. The passive optical network system according to claim 9, wherein
the bandwidth information generation section refers to the transmission speed information storage section to determine the ratio in accordance with the number of the slave stations of the first transmission speed and the number of the slave stations of the second transmission speed.

11. The passive optical network system according to claim 9, wherein
after the bandwidth information generation section determines the first and second transmission timings of the data of the first and the second transmission speeds within the range according to the ratio, when either a part of bandwidth for the first transmission speed or a part of bandwidth for the second transmission speed is not used, the bandwidth information generation section determines a third transmission timing for transmitting the data of the first or the second transmission speed using the part of bandwidth.

12. The passive optical network system according to claim 4, wherein
the master station transmits information of the determined transmission timings and the transmission speed information of data transmitted at the respective transmission timings to the plural slave stations, and
at least one of the slave stations captures, in accordance with the transmission timings and the transmission speed information, the data of the timing corresponding to the first or the second transmission speed of the slave station itself from the received signal which is inputted from the optical fiber network and whose level is adjusted by the automatic gain adjustment circuit.

13. The passive optical network system according to claim 4, wherein
the master station transmits information of the determined transmission timings and the slave station identification information indicating the destinations of the frames transmitted at the respective transmission timings to the plural slave stations, and
the plural slave stations capture, in accordance with the transmission timings and the slave station identification information, data at the timing when the slave station identification information indicates the slave station itself from the received signal which is inputted from the optical fiber network and whose level is adjusted by the automatic gain adjustment circuit.

14. An optical line terminator in a passive optical network system including the optical line terminator to time-division multiplex signals of a first transmission speed and a second transmission speed and to perform communication, plural optical network units including a first optical network unit to communicate with the optical line terminator at the first transmission speed and a second optical network unit to communicate with the optical line terminator at the second transmission speed, and an optical fiber network in which the signals from the optical line terminator are transmitted to the respective optical network units through a splitter, wherein each of the optical network units includes an automatic gain adjustment circuit to adjust signal level of received signal, the signal level varying according to a change of transmission speed of the received signal, and the optical line terminator comprises:

a frame assembling section to generate a frame in which payload and/or overhead information of the first transmission speed, payload and/or overhead information of the second transmission speed, and a dummy signal inserted to a place where the transmission speed is changed are time-division multiplexed; and a transmission section to convert the frame generated by the frame assembling section into an optical signal and to transmit the optical signal to the optical line terminator.

* * * * *